(12) United States Patent
Hiyoshi et al.

(10) Patent No.: US 9,150,090 B2
(45) Date of Patent: Oct. 6, 2015

(54) POWER TRANSMISSION SYSTEM

(71) Applicant: HONDA MOTOR CO., LTD., Tokyo (JP)

(72) Inventors: Toshio Hiyoshi, Wako (JP); Keiichi Ooiso, Wako (JP); Tetsuya Otani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/361,245

(22) PCT Filed: Nov. 27, 2012

(86) PCT No.: PCT/JP2012/080654
§ 371 (c)(1),
(2) Date: May 28, 2014

(87) PCT Pub. No.: WO2013/080982
PCT Pub. Date: Jun. 6, 2013

(65) Prior Publication Data
US 2014/0349812 A1 Nov. 27, 2014

(30) Foreign Application Priority Data
Dec. 1, 2011 (JP) .................................. 2011-263942

(51) Int. Cl.
*B60W 10/02* (2006.01)
*B60K 1/02* (2006.01)
(Continued)

(52) U.S. Cl.
CPC .................. *B60K 1/02* (2013.01); *B60K 7/0007* (2013.01); *B60K 17/046* (2013.01);
(Continued)

(58) Field of Classification Search
CPC .................. B60K 1/02; B60K 17/046; B60K 2007/0046; B60K 2007/0092
USPC .......... 477/6, 2, 3; 475/5, 150, 248, 275, 159, 475/160, 161, 280, 203, 204, 207; 180/65.23, 65.235, 65.6, 65.7, 65.26
See application file for complete search history.

(56) References Cited

U.S. PATENT DOCUMENTS 6,827,165 B2 * 12/2004 Schmidt .................... 180/65.235
7,317,259 B2 * 1/2008 Yamauchi ................... 290/40 C
(Continued)

FOREIGN PATENT DOCUMENTS

JP     07-293644 A     11/1995
JP     2009-286367 A     12/2009
(Continued)

OTHER PUBLICATIONS

International Search Report, dated Feb. 5, 2013, issued in corresponding application No. PCT/JP2012/080654.

*Primary Examiner* — David J Hlavka
(74) *Attorney, Agent, or Firm* — Westerman, Hattori, Daniels & Adrian, LLP

(57) ABSTRACT

In a power transmission system, a ring gear of a first speed reducer and a ring gear of a second speed reducer are coupled to each other and have the same rotational axis. An engagement portion between the ring gear and a planetary gear is formed such that, when a first motor generates a rotational torque in the forward direction, a force acts on the ring gear in a direction approaching the second speed reducer in the rotational axis direction. An engagement portion between the ring gear and a planetary gear is formed such that, when a second motor generates a rotational torque in the forward direction, a force acts on the ring gear of the second speed reducer in a direction of approaching the first speed reducer in the rotational axis direction.

21 Claims, 12 Drawing Sheets

(51) Int. Cl.
   *B60K 17/356* (2006.01)
   *B60K 7/00* (2006.01)
   *B60K 17/04* (2006.01)
   *F16H 3/44* (2006.01)

(52) U.S. Cl.
   CPC ............... *B60K 17/356* (2013.01); *F16H 3/44* (2013.01); *B60K 2007/0046* (2013.01); *B60K 2007/0092* (2013.01); *Y10T 477/27* (2015.01)

(56) References Cited

U.S. PATENT DOCUMENTS

| | | | | |
|---|---|---|---|---|
| 7,326,141 | B2* | 2/2008 | Lyons et al. | 475/28 |
| 8,029,399 | B2* | 10/2011 | Thompson | 475/150 |
| 8,056,659 | B2* | 11/2011 | Oba et al. | 180/65.225 |
| 8,078,371 | B2* | 12/2011 | Cawthorne et al. | 701/54 |
| 8,424,622 | B2* | 4/2013 | Ideshio et al. | 180/65.225 |
| 8,449,426 | B2* | 5/2013 | Nishimura | 475/170 |
| 8,602,936 | B2* | 12/2013 | Ichikawa et al. | 475/170 |
| 2010/0105511 | A1* | 4/2010 | Thompson | 475/6 |
| 2013/0116078 | A1* | 5/2013 | Hokoi | 475/5 |

FOREIGN PATENT DOCUMENTS

JP 2010-048379 A 3/2010
JP 2010-235051 A 10/2010

* cited by examiner

POWER TRANSMISSION SYSTEM

TECHNICAL FIELD

The present invention relates to a power transmission system including: a first speed changer connected to an output shaft of a first power source; and a second speed changer connected to a second power source.

BACKGROUND ART

As a power transmission system like this, Patent Literature 1 discloses a configuration that a first speed changer and a second speed changer are constructed from planetary gear mechanisms and that ring gears thereof are coupled to each other in a manner not permitting relative rotation. When the ring gear engages with the planetary gear, a thrust force acts on the ring gear in the axial direction. Nevertheless, Patent Literature 1 does not mention this point at all.

In contrast, Patent Literature 2 describes that a thrust force generated between a large diameter gear of a double pinion and an idler gear and a thrust force generated between a small diameter gear of a double pinion and a driving output gear canceled out with each other through a thrust bearing arranged between the double pinion of a first speed changer and the double pinion of a second speed changer which are located opposite to each other.

Further, a power transmission system described in Patent Literature 3 describes a thrust force generated in a large diameter gear of a double pinion of a planetary gear mechanism and a thrust force generated in a small diameter gear of the double pinion are canceled out with each other in the inside of the double pinion.

RELATED ART REFERENCES

Patent Literature

Patent Literature 1: Japan JP-2010-235051-A
Patent Literature 2: Japan JP-2010-48379-A
Patent Literature 3: Japan JP-7-293644-A

SUMMARY OF THE INVENTION

Problem that the Invention is to Solve

Nevertheless, in the power transmission system described in Patent Literature 2, the thrust forces in the double pinions are canceled out with each other in the thrust bearing. Thus, this system cannot directly be applied unless it has the configuration such that double pinions can perform power transmission in the axial direction through a thrust bearing.

In the power transmission system described in Patent Literature 3, the thrust forces are canceled out with each other in the double pinion in the inside of one planetary gear mechanism. Thus, in a power transmission system employing two speed changers, with taking into consideration the relations with other members, further reduction of the thrust forces is desired.

The present invention has been devised in view of the above-mentioned problems. An object of the present invention is to provide a power transmission system in which two speed changers are employed and thrust forces can be reduced.

Means for Solving the Problem

In order to achieve the above-mentioned object, the invention according to claim 1 is characterized by a power transmission system including:

a first speed changer (e.g., a first planetary gear type speed reducer 12A in embodiment) connected to an output shaft (e.g., a cylindrical shaft 16A in embodiment) of a first power source (e.g., a first motor 2A in embodiment); and a second speed changer (e.g., a second planetary gear type speed reducer 12B in embodiment) connected to an output shaft (e.g., a cylindrical shaft 16B in embodiment) of a second power source (e.g., a second motor 2B in embodiment), wherein:

each of the first speed changer and the second speed changer includes plural rotational elements;

a first rotational element (e.g., a ring gear 24A in embodiment) of the first speed changer and a first rotational element (e.g., a ring gear 24B in embodiment) of the second speed changer are coupled to each other in a manner permitting integrated rotation and have a same rotational axis;

the first speed changer includes a second rotational element (e.g., a planetary gear 22A in embodiment) engaging with the first rotational element;

an engagement portion between the first rotational element and the second rotational element of the first speed changer is formed such that, when the first power source generates a rotational torque in one direction, a force acts on the first rotational element of the first speed changer in a direction of approaching the second speed changer along the rotational axis direction;

the second speed changer includes a second rotational element (e.g., a planetary gear 22B in embodiment) engaging with the first rotational element; and an engagement portion between the first rotational element and the second rotational element of the second speed changer is formed such that, when the second power source generates a rotational torque in one direction, a force acts on the first rotational element of the second speed changer in a direction of approaching the first speed changer along the rotational axis direction.

Further, the invention according to claim 2 is characterized in that, in addition to the configuration according to claim 1:

the engagement portion between the first rotational element and the second rotational element of the first speed changer is formed such that, when the first power source generates the rotational torque in the one direction, a force acts on the second rotational element of the first speed changer in a direction of departing from the second speed changer along the rotational axis direction;

the engagement portion between the first rotational element and the second rotational element of the second speed changer is formed such that, when the second power source generates the rotational torque in the one direction, a force acts on the second rotational element of the second speed changer in a direction of departing from the first speed changer along the rotational axis direction;

with respect to the second rotational element of the first speed changer, a first bearing (e.g., a bearing Br1 in embodiment) capable of receiving the force acting on the second rotational element in the rotational axis direction is arranged on a side opposite to the second speed changer in the rotational axis direction; and with respect to the second rotational element of the second speed changer, a second bearing (e.g., a bearing Br2 in embodiment) capable of receiving the force acting on the second rotational element in the rotational axis direction is arranged on a side opposite to the first speed changer in the rotational axis direction.

Further, the invention according to claim 3 is characterized in that, in addition to the configuration according to claim 2:

the first speed changer includes a third rotational element (e.g., a sun gear 21A in embodiment) engaging with the second rotational element, and an engagement portion between the second rotational element and the third rotational element is formed such that, when the first power source generates the rotational torque in the one direction, a force acts on the third rotational element of the first speed changer in the direction of departing from the second speed changer along the rotational axis direction;

the second speed changer includes a third rotational element (e.g., a sun gear 21B in embodiment) engaging with the second rotational element, and an engagement portion between the second rotational element and the third rotational element is formed such that, when the second power source generates the rotational torque in the one direction, a force acts on the third rotational element of the second speed changer in the direction of departing from the first speed changer along the rotational axis direction;

with respect to the third rotational element of the first speed changer, a third bearing (e.g., a bearing Br3 in embodiment) capable of receiving the force acting on the third rotational element in the rotational axis direction is arranged on the side opposite to the second speed changer in the rotational axis direction; and with respect to the third rotational element of the second speed changer, a fourth bearing (e.g., a bearing Br4 in embodiment) capable of receiving the force acting on the third rotational element in the rotational axis direction is arranged on the side opposite to the first speed changer in the rotational axis direction.

Further, the invention according to claim 4 is characterized in that, in addition to the configuration according to any one of claims 1 to 3:

each of the first speed changer and the second speed changer is a planetary gear mechanism;

the planetary gear mechanism includes a sun gear (e.g., a sun gear 21A or 21B in embodiment), a planetary gear (e.g., a planetary gear 22A or 22B in embodiment) engaging with the sun gear, a planetary carrier (e.g., a planetary carrier 23A or 23B in embodiment) supporting the planetary gear, and a ring gear (e.g., a ring gear 24A or 24B in embodiment) engaging with an outer periphery side of the planetary gear;

the first rotational element is the ring gear; and the second rotational element is the planetary gear.

Further, the invention according to claim 5 is characterized in that, in addition to the configuration according to claim 4, the planetary gear is a double pinion constructed such that a large diameter pinion (e.g., a first pinion 26A or 26B in embodiment) and a small diameter pinion (e.g., a second pinion 27A or 27B in embodiment) are connected to each other.

Further, the invention according to claim 6 is characterized in that, in addition to the configuration according to claim 2, the first rotational element of the first speed changer and the first rotational element of the second speed changer are coupled in a manner permitting power transmission in the rotational direction and permitting power transmission in a direction of pushing each other in the rotational axis direction and in a direction of pulling each other in the rotational axis direction.

Further, the invention according to claim 7 is characterized in that, in addition to the configuration according to claim 2, the first rotational element of the first speed changer and the first rotational element of the second speed changer are coupled in a manner permitting power transmission in the rotational direction and permitting power transmission in a direction of pushing each other in the rotational axis direction and not permitting power transmission in a direction of pulling each other in the rotational axis direction.

Further, the invention according to claim 8 is characterized in that, in addition to the configuration according to claim 6 or 7:

the engagement portion between the first rotational element and the second rotational element of the first speed changer is formed such that, when the first power source generates a rotational torque in the other direction reverse to the one direction, a force acts on the first rotational element of the first speed changer in the direction of departing from the second speed changer along the rotational axis direction; and the engagement portion between the first rotational element and the second rotational element of the second speed changer is formed such that, when the second power source generates a rotational torque in the other direction, a force acts on the first rotational element of the second speed changer in the direction of departing from the first speed changer along the rotational axis direction.

Further, the invention according to claim 9 is characterized in that, in addition to the configuration according to claim 8:

the engagement portion between the first rotational element and the second rotational element of the first speed changer is formed such that, when the first power source generates the rotational torque in the other direction, a force acts on the second rotational element of the first speed changer in the direction of approaching the second speed changer along the rotational axis direction;

the engagement portion between the first rotational element and the second rotational element of the second speed changer is formed such that, when the second power source generates the rotational torque in the other direction, a force acts on the second rotational element of the second speed changer in the direction of approaching the first speed changer along the rotational axis direction;

with respect to the second rotational element of the first speed changer, a fifth bearing (e.g., a bearing Br5 or a bearing Br13 in embodiment) capable of receiving the force acting on the second rotational element in the rotational axis direction is arranged on the second speed changer side in the rotational axis direction; and with respect to the second rotational element of the second speed changer, a sixth bearing (e.g., a bearing Br6 or a bearing Br13 in embodiment) capable of receiving the force acting on the second rotational element in the rotational axis direction is arranged on the first speed changer side in the rotational axis direction.

Further, the invention according to claim 10 is characterized in that, in addition to the configuration according to claim 9:

the first speed changer includes a third rotational element (e.g., a sun gear 21A in embodiment) engaging with the second rotational element, and an engagement portion between the second rotational element and the third rotational element is formed such that, when the first power source generates the rotational torque in the other direction, a force acts on the third rotational element of the first speed changer in the direction of approaching the second speed changer along the rotational axis direction;

the second speed changer includes a third rotational element (e.g., a sun gear 21B in embodiment) engaging with the second rotational element, and an engagement portion between the second rotational element and the third rotational element is formed such that, when the second power source generates the rotational torque in the other direction, a force acts on the third rotational element of the second speed changer in the direction of approaching the first speed changer along the rotational axis direction;

with respect to the third rotational element of the first speed changer, a seventh bearing (e.g., a bearing Br7 in embodiment) capable of receiving the force acting on the third rotational element in the rotational axis direction is arranged on the side opposite to the second speed changer in the rotational axis direction; and with respect to the third rotational element of the second speed changer, an eighth bearing (e.g., a bearing Br8 in embodiment) capable of receiving the force acting on the third rotational element in the rotational axis direction is arranged on the side opposite to the first speed changer in the rotational axis direction.

Further, the invention according to claim 11 is characterized in that, in addition to the configuration according to claim 10:

a first partitioning wall (e.g., a partition 18A in embodiment) partitioning the first power source and the first speed changer from each other is provided between the first power source and the first speed changer;

a second partitioning wall (e.g., a partition 18B in embodiment) partitioning the second power source and the second speed changer from each other is provided between the second power source and the second speed changer;

the first bearing and the seventh bearing are arranged in the first partitioning wall; and the second bearing and the eighth bearing are arranged in the second partitioning wall.

Further, the invention according to claim 12 is characterized in that, in addition to the configuration according to any one of claims 6 to 11:

each of the first speed changer and the second speed changer is a planetary gear mechanism (e.g., a first planetary gear type speed reducer 12A or 12B in embodiment);

the planetary gear mechanism includes a sun gear (e.g., a sun gear 21A or 21B in embodiment), a planetary gear (e.g., a planetary gear 22A or 22B in embodiment) engaging with the sun gear, a planetary carrier (e.g., a planetary carrier 23A or 23B in embodiment) supporting the planetary gear, and a ring gear (e.g., a ring gear 24A or 24B in embodiment) engaging with an outer periphery side of the planetary gear;
    the first rotational element is the ring gear; and
    the second rotational element is the planetary gear.

Further, the invention according to claim 13 is characterized in that, in addition to the configuration according to claim 12:

the ring gear of the first speed changer includes a gear portion (e.g., a gear portion 28A in embodiment) and an extension portion (e.g., an inner-diameter side extension portion 41A or an axis-directional extension portion 40A in embodiment) extended from the second speed changer side end portion of the gear portion;

the ring gear of the second speed changer includes a gear portion (e.g., a gear portion 28B in embodiment) and an extension portion (e.g., an inner-diameter side extension portion 41B or an axis-directional extension portion 40B in embodiment) extended from the first speed changer side end portion of the gear portion; and the ring gear of the first speed changer and the ring gear of the second speed changer abut against each other at the extension portions.

Further, the invention according to claim 14 is characterized in that, in addition to the configuration according to claim 13:

the extension portion of the ring gear of the first speed changer includes an axis-directional extension portion (e.g., an axis-directional extension portion 40A in embodiment) extending toward the rotational axis direction; and the extension portion of the ring gear of the second speed changer includes an axis-directional extension portion (e.g., an axis-directional extension portion 40B in embodiment) extending toward the rotational axis direction.

Further, the invention according to claim 15 is characterized in that, in addition to the configuration according to any one of claims 12 to 14, the planetary gear is a double pinion constructed such that a large diameter pinion (e.g., a first pinion 26A or 26B in embodiment) and a small diameter pinion (e.g., a second pinion 27A or 27B in embodiment) are connected to each other.

Further, the invention according to claim 16 is characterized in that, in addition to the configuration according to claim 7:

the engagement portion between the first rotational element and the second rotational element of the first speed changer is formed such that, when the first power source generates a rotational torque in the other direction reverse to the one direction, a force acts on the first rotational element of the first speed changer in the direction of departing from the second speed changer along the rotational axis direction;

the engagement portion between the first rotational element and the second rotational element of the second speed changer is formed such that, when the second power source generates a rotational torque in the one direction, a force acts on the first rotational element of the second speed changer in the direction of departing from the first speed changer along the rotational axis direction;

the engagement portion between the first rotational element and the second rotational element of the first speed changer is formed such that, when the first power source generates the rotational torque in the other direction, a force acts on the second rotational element of the first speed changer in the direction of approaching the second speed changer along the rotational axis direction;

the engagement portion between the first rotational element and the second rotational element of the second speed changer is formed such that, when the second power source generates the rotational torque in the other direction, a force acts on the second rotational element of the second speed changer in the direction of approaching the first speed changer along the rotational axis direction;

with respect to the second rotational element of the first speed changer, a fifth bearing (e.g., a bearing Br5 or a bearing Br13 in embodiment) capable of receiving the force acting on the second rotational element in the rotational axis direction is arranged on the second speed changer side in the rotational axis direction;

with respect to the second rotational element of the second speed changer, a sixth bearing (e.g., a bearing Br6 or a bearing Br13 in embodiment) capable of receiving the force acting on the second rotational element in the rotational axis direction is arranged on the first speed changer side in the rotational axis direction;

each of the first speed changer and the second speed changer is a planetary gear mechanism (e.g., a first planetary gear type speed reducer 12A or 12B in embodiment);

the planetary gear mechanism includes a sun gear (e.g., a sun gear 21A or 21B in embodiment), a planetary gear (e.g., a planetary gear 22A or 22B in embodiment) engaging with the sun gear, a planetary carrier (e.g., a planetary carrier 23A or 23B in embodiment) supporting the planetary gear, and a ring gear (e.g., a ring gear 24A or 24B in embodiment) engaging with an outer periphery side of the planetary gear;

the first rotational element is the ring gear;

the second rotational element is the planetary gear;

the ring gear of the first speed changer includes a gear portion (e.g., a gear portion 28A in embodiment) and an extension portion (e.g., an inner-diameter side extension portion 41A or an axis-directional extension portion 40A in embodiment) extended from the second speed changer side end portion of the gear portion;

the ring gear of the second speed changer includes a gear portion (e.g., a gear portion 28B in embodiment) and an extension portion (e.g., an inner-diameter side extension portion 41B or an axis-directional extension portion 40B in embodiment) extended from the first speed changer side end portion of the gear portion;

the ring gear of the first speed changer and the ring gear of the second speed changer abut against each other at the extension portions;

the extension portion of the ring gear of the first speed changer includes an inner-diameter side extension portion (e.g., an inner-diameter side extension portion 41A in embodiment) extending toward a radial inward direction; and the extension portion of the ring gear of the second speed changer includes an inner-diameter side extension portion (e.g., an inner-diameter side extension portion 41B in embodiment) extending toward the radial inward direction.

Further, the invention according to claim 17 is characterized in that, in addition to the configuration according to claim 16:

the inner-diameter side extension portion of the ring gear of the first speed changer and the planetary carrier of the first speed changer are constructed such as to overlap with each other in a radial direction;

the inner-diameter side extension portion of the ring gear of the second speed changer and the planetary carrier of the second speed changer are constructed such as to overlap with each other in the radial direction;

the fifth bearing is arranged between the ring gear of the first speed changer and the planetary carrier of the first speed changer; and the sixth bearing is arranged between the ring gear of the second speed changer and the planetary carrier of the second speed changer.

Further, the invention according to claim 18 is characterized in that, in addition to the configuration according to claim 7:

the engagement portion between the first rotational element and the second rotational element of the first speed changer is formed such that, when the first power source generates a rotational torque in the other direction reverse to the one direction, a force acts on the first rotational element of the first speed changer in the direction of departing from the second speed changer along the rotational axis direction;

the engagement portion between the first rotational element and the second rotational element of the second speed changer is formed such that, when the second power source generates a rotational torque in the one direction, a force acts on the first rotational element of the second speed changer in the direction of departing from the first speed changer along the rotational axis direction;

the engagement portion between the first rotational element and the second rotational element of the first speed changer is formed such that, when the first power source generates the rotational torque in the other direction, a force acts on the second rotational element of the first speed changer in the direction of approaching the second speed changer along the rotational axis direction;

the engagement portion between the first rotational element and the second rotational element of the second speed changer is formed such that, when the second power source generates the rotational torque in the other direction, a force acts on the second rotational element of the second speed changer in the direction of approaching the first speed changer along the rotational axis direction;

with respect to the second rotational element of the first speed changer, a fifth bearing (e.g., a bearing Br5 or a bearing Br13 in embodiment) capable of receiving the force acting on the second rotational element in the rotational axis direction is arranged on the second speed changer side in the rotational axis direction;

with respect to the second rotational element of the second speed changer, a sixth bearing (e.g., a bearing Br6 or a bearing Br13 in embodiment) capable of receiving the force acting on the second rotational element in the rotational axis direction is arranged on the first speed changer side in the rotational axis direction;

each of the first speed changer and the second speed changer is a planetary gear mechanism (e.g., a first planetary gear type speed reducer 12A or 12B in embodiment);

the planetary gear mechanism includes a sun gear (e.g., a sun gear 21A or 21B in embodiment), a planetary gear (e.g., a planetary gear 22A or 22B in embodiment) for engaging with the sun gear, a planetary carrier (e.g., a planetary carrier 23A or 23B in embodiment) for supporting the planetary gear, and a ring gear (e.g., a ring gear 24A or 24B in embodiment) for engaging with an outer periphery side of the planetary gear;

the first rotational element is the ring gear;

the second rotational element is the planetary gear;

the ring gear of the first speed changer includes a gear portion (e.g., a gear portion 28A in embodiment) and an extension portion (e.g., an inner-diameter side extension portion 41A or an axis-directional extension portion 40A in embodiment) extended from the second speed changer side end portion of the gear portion;

the ring gear of the second speed changer includes a gear portion (e.g., a gear portion 28B in embodiment) and an extension portion (e.g., an inner-diameter side extension portion 41B or an axis-directional extension portion 40B in embodiment) extended from the first speed changer side end portion of the gear portion;

the ring gear of the first speed changer and the ring gear of the second speed changer abut against each other at the extension portions;

the extension portion of the ring gear of the first speed changer includes an axis-directional extension portion extending toward the rotational axis direction;

the extension portion of the ring gear of the second speed changer includes an axis-directional extension portion extending toward the rotational axis direction;

the ring gear of the first speed changer includes a stopper (e.g., a stopper 42A in embodiment) provided on a side opposite to the axis-directional extension portion of the ring gear in the rotational axis direction and restricting the ring gear from moving in the rotational axis direction; and the ring gear of the second speed changer includes a stopper (e.g., a stopper 42B in embodiment) provided on a side opposite to the axis-directional extension portion of the ring gear in the rotational axis direction and restricting the ring gear from moving in the rotational axis direction.

Further, the invention according to claim 19 is characterized in that, in addition to the configuration according to any one of claims 1 to 18, the first rotational element of the first speed changer and the first rotational element of the second speed changer are fixed to a fixed portion (e.g., a case 11 in embodiment) and coupled in the rotational direction.

Further, the invention according to claim 20 is characterized in that, in addition to the configuration according to any one of claims 1 to 19, the first and the second speed changers are arranged adjacent to each other between the first and the second power sources.

Further, the invention according to claim 21 is characterized in that, in addition to the configuration according to any one of claims 1 to 20:

the first power source is connected through the first speed changer to a left wheel (e.g., a left rear wheel LWr in embodiment) of a vehicle (e.g., a vehicle 3 in embodiment);

the second power source is connected through the second speed changer to a right wheel (e.g., a right rear wheel RWr in embodiment) of the vehicle; and when the first and the second power sources generate the rotational torques in the one direction so that the left wheel and the right wheel rotate in the one direction, the vehicle moves in a forward direction.

Advantage of the Invention

According to the invention of claim 1, when the first and the second power sources generate rotational torques in the one direction, forces act on the first rotational elements of the first and the second speed changers in the direction of approaching each other. Thus, the force acting on the first rotational element of the first speed changer in the direction of approaching the second speed changer and the force acting on the first rotational element of the second speed changer in the direction of approaching the first speed changer can be canceled out with each other.

According to the invention of claim 2, as a reaction to a configuration that the engagement is formed such that, when the first and the second power sources generate rotational torques in the one direction, forces act in the direction that the first rotational elements approach each other, the second rotational elements receive forces in a direction of departing from each other in the axial direction. Thus, when the forces are received by the first and the second bearings, the second rotational elements are prevented from moving excessively.

According to the invention of claim 3, as a reaction to a configuration that the engagement is formed such that, when the first and the second power sources generate rotational torques in the one direction, forces act in the direction that the first rotational elements approach each other, the third rotational elements receive forces in the direction of departing from each other in the axial direction. Thus, when the forces are received by the third and the fourth bearings, the third rotational elements are prevented from moving excessively.

According to the invention of claim 4, each of the first speed changer and the second speed changer is composed of a planetary gear mechanism. Thus, in a state that size increase in the radial direction is suppressed, a high transmission gear ratio can be realized.

According to the invention of claim 5, in the engagement portion of the large diameter pinion and the engagement portion of the small diameter pinion, the engagement condition such as the inclination of the tooth surface can be formed separately and independently. This permits adjustment of the direction and the magnitude of the thrust force acting on the entirety of the planetary gear which is the total of the thrust forces of the engagement portion of the large diameter pinion and the engagement portion of the small diameter pinion.

According to the invention of claim 6, since the first rotational elements are coupled to each other also in the axial direction, the power in the rotational direction can be transmitted between the first rotational elements. Further, when forces of pushing and pulling each other in the rotational axis direction act on the individual first rotational elements, these forces can be canceled out with each other.

According to the invention of claim 7, since the first rotational elements are separate from each other and not coupled to each other in the axial direction, the power in the rotational direction can be transmitted between the first rotational elements. Further, when forces of pulling each other in the rotational axis direction act on the individual first rotational elements, these elements can be separated from each other.

According to the invention of claim 8, when the first and the second power sources generate rotational torques in the other direction, forces act on the first rotational elements in a direction of departing from each other. Thus, even when the torques generated from the first and the second power sources are not identical to each other, the system can be divided into the first speed changer and the second speed changer.

According to the invention of claim 9, as a reaction to a configuration that the engagement is formed such that, when the first and the second power sources generate rotational torques in the other direction, forces act in the direction that the first rotational elements depart from each other, the second rotational elements receive forces in the direction of approaching each other in the axial direction. Thus, when the forces are received by the fifth and the sixth bearings, the second rotational elements are prevented from moving excessively.

According to the invention of claim 10, as a reaction to a configuration that the first rotational elements form the engagement such that, when the first and the second power sources generate rotational torques in the other direction, forces act on the first rotational elements in the direction of departing from each other, the third rotational elements receive forces in the direction of approaching each other in the axial direction. Thus, when the forces are received by the seventh and the eighth bearings, the third rotational elements are prevented from moving excessively. Further, the space where the seventh and the eighth bearings are not arranged can be used effectively.

According to the invention of claim 11, when the thrust forces of the first bearing and the seventh bearing act on the same partitioning wall, the thrust forces can be canceled out with each other through the partitioning wall. Similarly, when the thrust forces of the second bearing and the eighth bearing act on the same partitioning wall, the thrust forces can be canceled out with each other through the partitioning wall.

According to the invention of claim 12, each of the first speed changer and the second speed changer is composed of a planetary gear mechanism. Thus, in a state that size increase in the radial direction is suppressed, a high transmission gear ratio can be realized.

According to the invention of claim 13, the ring gear of the first speed changer and the ring gear of the second speed changer abut against each other at the extension portions. Thus, the ring gears can abut against each other without affecting the engagement portion between the ring gear and the planetary gear.

According to the invention of claim 14, the configuration can be simplified.

According to the invention of claim 15, in the engagement portion of the large diameter pinion and the engagement portion of the small diameter pinion, the engagement condition such as the inclination of the tooth surface can be formed separately and independently. This permits adjustment of the direction and the magnitude of the thrust force acting on the entirety of the planetary gear which is the total of the thrust forces of the engagement portion of the large diameter pinion and the engagement portion of the small diameter pinion.

According to the invention of claim 16, a recess is formed between the first speed changer and the second speed changer by the extension portion. Thus, other members can be arranged by using the recess.

According to the invention of claim 17, when forces act on the planetary gear of the first speed changer and the planetary gear of the second speed changer in the direction of approaching each other, these gears are supported through the fifth and the sixth bearings by the ring gear of the first speed changer and the ring gear of the second speed changer. Thus, the forces acting on the planetary carrier of the first speed changer and the planetary carrier of the second speed changer can be received by the ring gear of the first speed changer and the ring gear of the second speed changer.

According to the invention of claim 18, when forces act on the ring gears of the first and the second speed changers in the direction of departing from each other, movement of the ring gears of the first and the second speed changers is restricted by the stoppers. By virtue of this, the forces acting on the ring gears in the direction of departing from each other can be absorbed by the stoppers without being transmitted to other members such as the planetary carriers.

According to the invention of claim 19, in a case that rotation of the ring gears is unnecessary, both ring gears may be fixed to the fixed portion such as the case so that the structure can be simplified.

According to the invention of claim 20, the first and the second speed changers are arranged adjacent to each other. Thus, the first rotational elements to be coupled to each other can be arranged close to each other so that a member necessary for linkage can be made small.

According to the invention of claim 21, when setting is performed such that rotational torques in the one direction are generated at the time of forward traveling which is used more frequently among forward traveling and backward traveling, the thrust forces acting on the first rotational elements can be canceled out with each other by the first rotational elements alone.

MODE FOR CARRYING OUT THE INVENTION

A power transmission system according to the present invention can preferably be used in a vehicle driving system. A vehicle driving system described below employs motors as power sources for wheel drive and is used, for example, in a vehicle employing a drive system like that shown in FIG. 1. Here, the flowing description is given for an example that the vehicle driving system is used for rear-wheel driving. Instead, the vehicle driving system may be used for front wheel driving.

Figure 1:
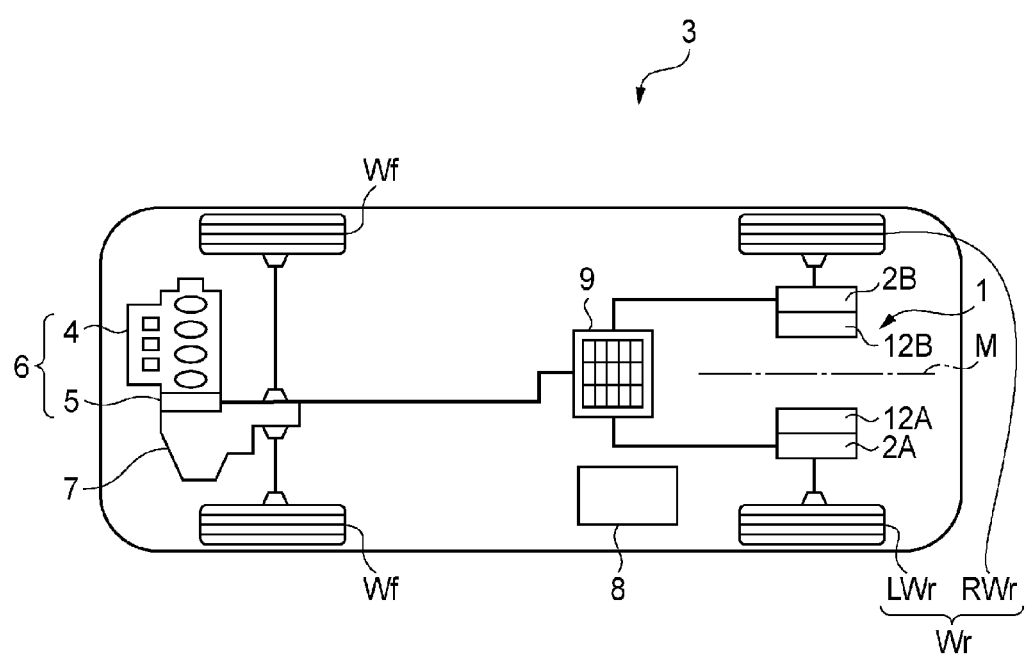
FIG. 1 is a block diagram showing a schematic configuration of a hybrid vehicle serving as an embodiment of a vehicle on which a vehicle driving system according to the present invention can be mounted.

A vehicle 3 shown in FIG. 1 is a hybrid vehicle in which a driving system 6 (referred to as a front-wheel driving system, hereinafter) constructed by connecting an motor 5 and an internal combustion engine 4 in series is provided in a vehicle front section. Then, the power of the front-wheel driving system 6 is transmitted through a transmission 7 to front wheels Wf while the power of a driving system 1 (referred to as a rear-wheel driving system, hereinafter) provided in a vehicle rear section separately from the front-wheel driving system 6 is transmitted to rear wheels Wr (RWr and LWr). The motor 5 of the front-wheel driving system 6 and the first and the second motors 2A and 2B of the rear-wheel driving system 1 on the rear wheel Wr side are connected to a battery 9 so that electric power supply from the battery 9 and energy regeneration to the battery 9 can be performed. In FIG. 1, numeral 8 indicates a controller for controlling the entirety of the vehicle.

<First Embodiment>

Figure 3:
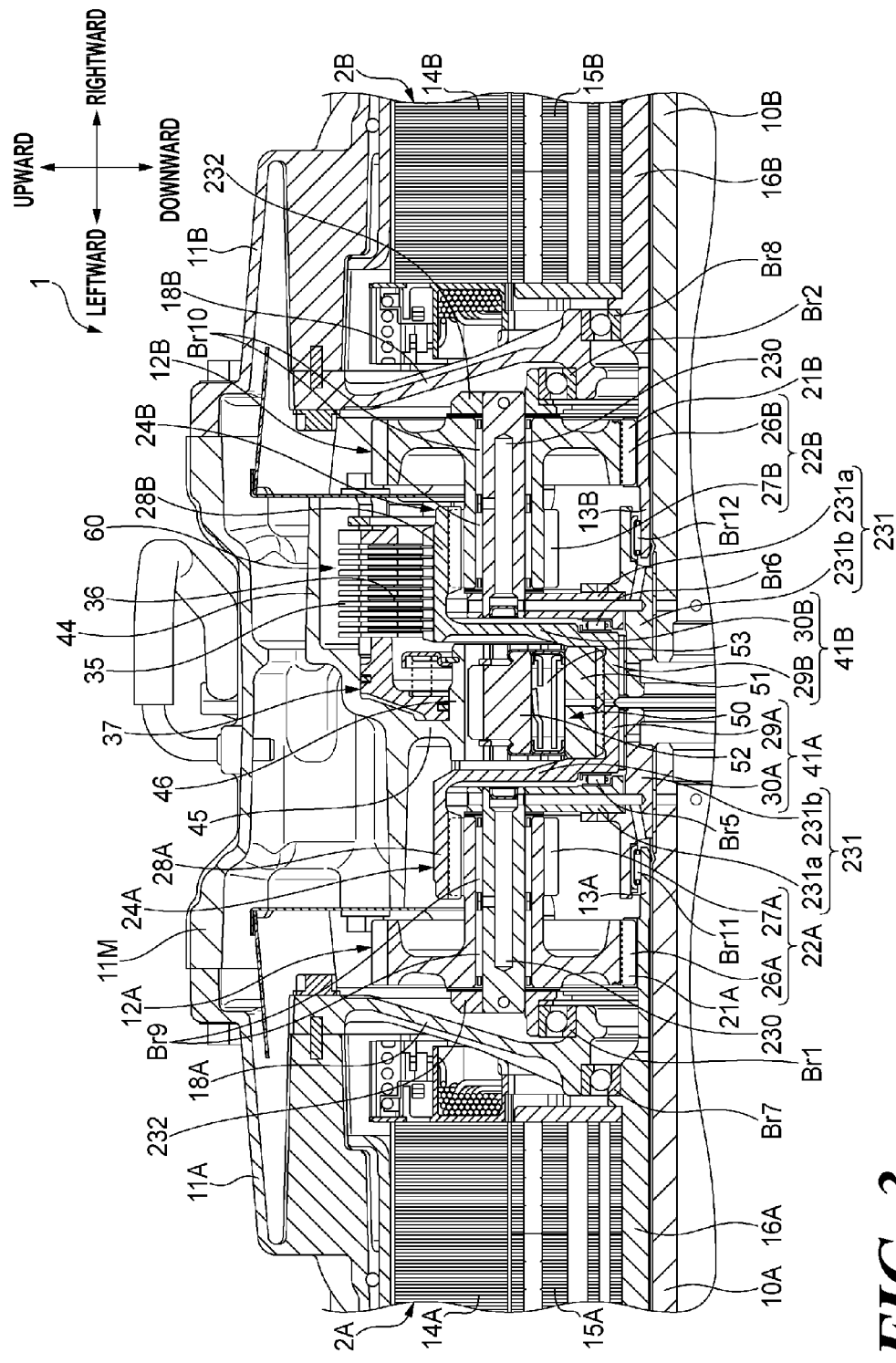
FIG. 3 is a partial enlarged view of a rear-wheel driving system shown in FIG. 2.
Figure 4:
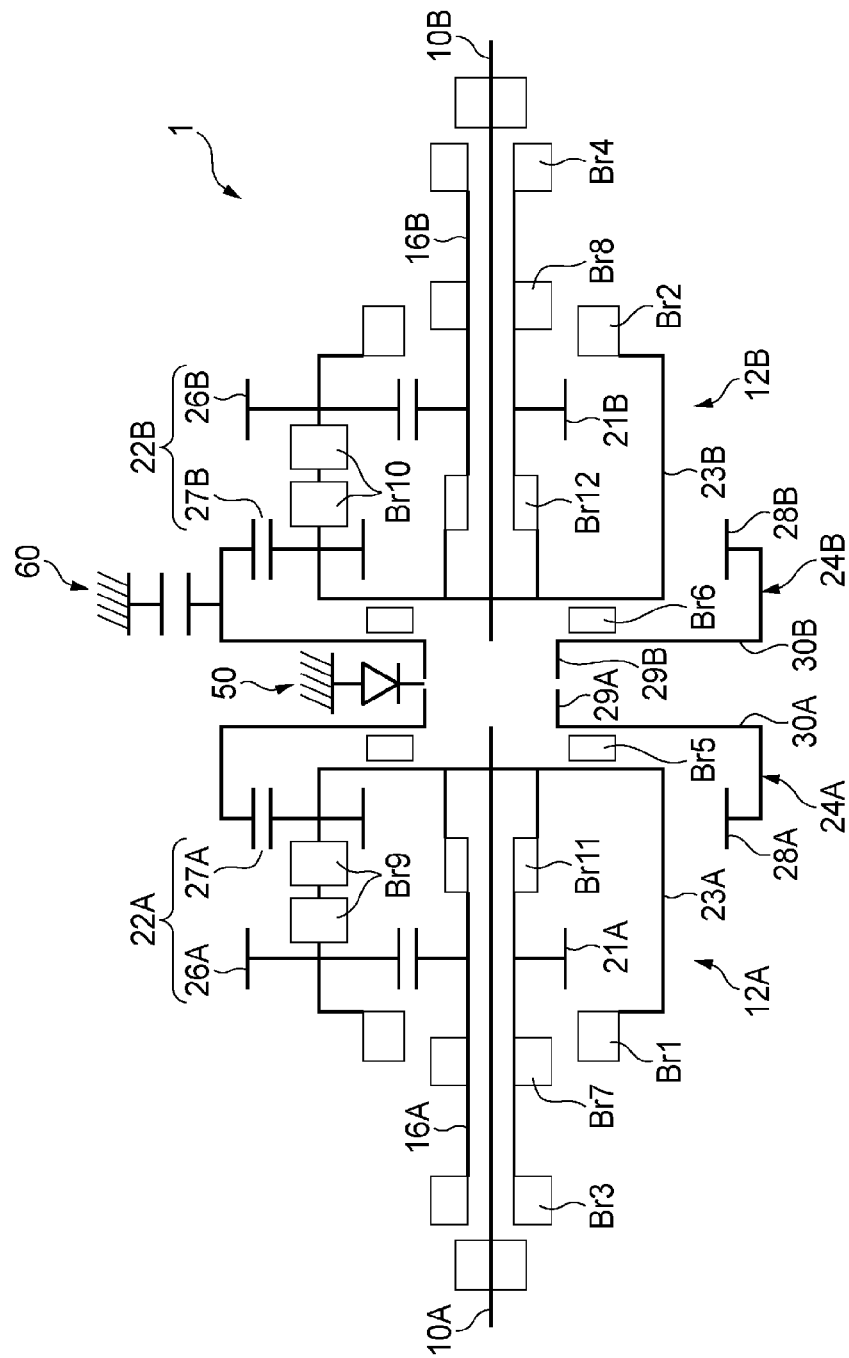
FIG. 4 is a schematic configuration diagram of a rear-wheel driving system shown in FIG. 2.

First, a vehicle driving system of a first embodiment on which a power transmission system according to the present invention is mounted is described below with reference to FIGS. 2 to 4. Arrows in the figures indicate the positional relation in a state that the rear-wheel driving system 1 is mounted on the vehicle.

Figure 2:
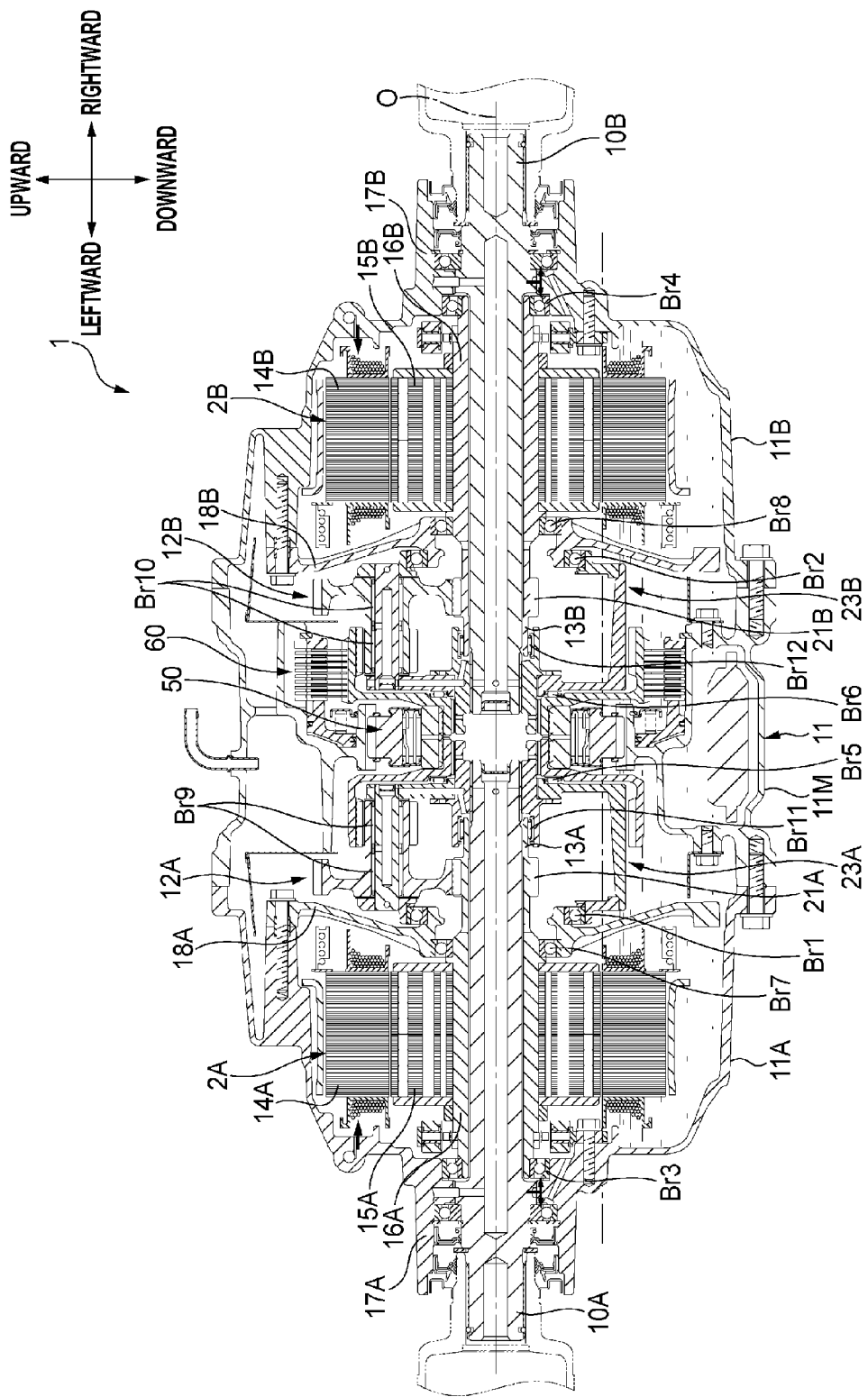
FIG. 2 is a vertical sectional view of a rear-wheel driving system of a first embodiment.

FIG. 2 shows a vertical sectional view of the entirety of the rear-wheel driving system 1. FIG. 3 is an expanded sectional view of the upper section of FIG. 2. In this figure, numeral 11 indicates a case of the rear-wheel driving system 1. The case 11 is constructed from a center case 11M arranged approximately in a center section in the vehicle width direction and side cases 11A and 11B arranged on the left and right of the center case 11M with the center case 11M in between. Then, the entirety thereof is formed in an approximately cylindrical shape. In the inside of the case 11, axles 10A and 10B for rear wheels Wr, a first and a second motors 2A and 2B for axle driving, and a first and a second planetary gear type speed reducers 12A and 12B serving as a first and a second speed changers for slowing down the drive rotation of the first and the second motors 2A and 2B are arranged such that the rotation axes O thereof are located on the same straight line. The axle 10A, the first motor 2A, and the first planetary gear type speed reducer 12A drive and control the left rear wheel LWr and the axle 10B, the second motor 2B, and the second planetary gear type speed reducer 12B drive and control the right rear wheel RWr. The axle 10A, the first motor 2A, and the first planetary gear type speed reducer 12A and the axle 10B, the second motor 2B, and the second planetary gear type speed reducer 12B are arranged symmetric with respect to a middle plane M in the vehicle width direction (the right and left directions) in the inside of the case 11.

On the center case 11M side of the side cases 11A and 11B, partitions 18A and 18B extended inward in the radial direction are provided respectively. Then, in the spaces surrounded by the side cases 11A and 11B and the partitions 18A and 18B, the first and the second motors 2A and 2B are arranged respectively. Further, in the space surrounded by the center case 11M and the partitions 18A and 18B, the first and the second planetary gear type speed reducers 12A and 12B are arranged adjacent to each other. In other words, the partitions 18A and 18B define the spaces for accommodating the first and the second motors 2A and 2B and the space for accommodating the first and the second planetary gear type speed reducers 12A and 12B.

In the first and the second motors 2A and 2B, stators 14A and 14B are fixed respectively to the side cases 11A and 11B. Then, annular rotors 15A and 15B are arranged on the inner periphery sides of the stators 14A and 14B in a manner permitting rotation. The inner periphery portions of the rotors 15A and 15B are coupled to cylindrical shafts 16A and 16B that surround the outer periphery of the axles 10A and 10B and serve as output shafts of the first and the second motors 2A and 2B. Then, the cylindrical shafts 16A and 16B are supported through the bearings Br3 and Br4 by end walls 17A and 17B of the side cases 11A and 11B and also supported through bearings Br7 and Br8 by the partitions 18A and 18B in a manner permitting relative rotation respectively coaxial to the axles 10A and 10B. Further, on the inner sides of the cylindrical shafts 16A and 16B in the axial direction, later-described sun gears 21A and 21B of the first and the second planetary gear type speed reducers 12A and 12B are formed in an integrated manner. Then, extending portions 13A and 13B are formed on the further inner sides relative to the sun gears 21A and 21B in the axial direction.

Further, the first and the second planetary gear type speed reducers 12A and 12B include: the sun gears 21A and 21B; plural planetary gears 22A and 22B for engaging with the sun gears 21A and 21B; planetary carriers 23A and 23B for supporting the planetary gears 22A and 22B; and ring gears 24A and 24B for engaging with the outer periphery sides of the planetary gears 22A and 22B. Then, driving forces of the first and the second motors 2A and 2B are inputted from the sun gears 21A and 21B and then outputted through the planetary carriers 23A and 23B to the axles 10A and 10B.

The planetary gears 22A and 22B are double pinions including: first pinions 26A and 26B of large diameter engaging directly with the sun gears 21A and 21B; and second pinions 27A and 27B having smaller diameters than the first pinions 26A and 26B. Then, the first pinion 26A or 26B and the second pinion 27A or 27B are formed integratedly with each other in a manner of being coaxial to each other and offset in the axial direction. The planetary gears 22A and 22B are supported through bearings Br9 and Br10 by the pinion shafts 230 of the planetary carriers 23A and 23B.

Further, in the planetary carriers 23A and 23B, the inner ends of the pinion shafts 230 extended in the axial direction are held by the inner side arms 231. The inner side arm 231 is constructed from: a carrier plate 231a extended in the radial direction; and a carrier base 231b attached in an integrated manner on the inner diameter side of the carrier plate 231a and spline-fit to the axle 10A or 10B in a manner permitting integrated rotation. The carrier bases 231b extend toward the extending portions 13A and 13B side such as to overlap with the extending portions 13A and 13B of the cylindrical shafts 16A and 16B in the axial direction, and then supported through bearings Br11 and Br12 by the extending portions 13A and 13B. Further, the carrier bases 231b extend also to the sides opposite to the extending portions 13A and 13B such as to overlap with later-described small diameter portions 29A and 29B of the ring gears 24A and 24B in the axial direction.

On the other hand, the outside ends of the pinion shafts 230 are supported through outer side arms 232 and the bearings Br1 and Br2 by the partitions 18A and 18B. That is, the partitions 18A and 18B are provided with: the bearings Br1 and Br2 for supporting respectively the planetary carriers 23A and 23B; and the bearings Br7 and Br8 for supporting the cylindrical shafts 16A and 16B.

Further, the axis-directional inner ends of the planetary gears 22A and 22B are supported by the inner side arms 231 of the planetary carriers 23A and 23B, and the axis-directional outer ends of the planetary gears 22A and 22B are supported by the outer side arms 232 of the planetary carriers 23A and 23B. Thus, thrust forces are transmitted between the planetary gears 22A and 22B and the planetary carriers 23A and 23B.

The inner peripheral surfaces of the ring gears 24A and 24B are provided with: gear portions 28A and 28B for engaging with the second pinions 27A and 27B of small diameter; and inner-diameter side extension portions 41A and 41B extending inward in the radial direction from the gear portions 28A and 28B. Then, the inner-diameter side extension portions 41A and 41B are provided with: small diameter portions 29A and 29B arranged opposite to each other at the middle position of the case 11; and linkage portions 30A and 30B for linking the axis-directional inner ends of the gear portions 28A and 28B and the axis-directional outer ends of the small diameter portions 29A and 29B with each other in the radial direction. The linkage portions 30A and 30B arranged such as to be opposite to and overlap with respectively the carrier plates 231a of the planetary carriers 23A and 23B in the radial direction. In the inner diameter sides of the carrier plates 231a, the bearings Br5 and Br6 are provided in between with the carrier plates 231a.

The gear portions 28A and 28B are opposite to each other in the axial direction in a manner that a cylindrical wall 46 formed in the inner-diameter side end portion of a left-right separating wall 45 of the center case 11M is located in between. The small diameter portions 29A and 29B constituting the inner-diameter side extension portions 41A and 41B are constructed such that the outer peripheral surfaces thereof are respectively spline-fit to an inner race 51 of a later-described one-way clutch 50 so that the ring gears 24A and 24B rotate integratedly with the inner race 51 of the one-way clutch 50. Further, the small diameter portions 29A and 29B are arranged such that, in the axial direction, the mutually opposite end portions are not fixed and can abut against each other. That is, the ring gears 24A and 24B are coupled to each other in a manner permitting power transmission in the rotational direction and coupled in a manner permitting power transmission in the direction of pushing each other in the axial direction and not permitting power transmission in the direction of pulling each other in the axial direction.

The center case 11M constituting the case 11 is provided with: a hydraulic brake 60 constituting brake unit for the ring gear 24B; and the one-way clutch 50. In the hydraulic brake 60, plural fixed plates 35 spline-fit to the inner peripheral surface of the cylindrical wall 44 of the center case 11M and plural rotary plates 36 spline-fit to the outer peripheral surface of the gear portion 28B of the ring gear 24B are arranged alternately in the axial direction. Then, these plates 35 and 36 are engaged and released by an annular piston 37. Thus, when both plates 35 and 36 are pushed by the piston 37, by virtue of friction fastening between both plates 35 and 36, a braking force acts on and fixes the ring gear 24B. From this state, when the engagement by the piston 37 is released, free rotation is permitted in the ring gear 24B. Here, as described above, the ring gears 24A and 24B are coupled to each other. When the hydraulic brake 60 is applied, the braking force acts also on and fixes the ring gear 24A. Then, when the hydraulic brake 60 is released, free rotation is permitted also in the ring gear 24A.

The one-way clutch 50 is constructed such that plural sprags 53 are arranged between the inner race 51 and the outer race 52 and that the inner race 51 is spline-fit to the small diameter portions 29A and 29B of the ring gears 24A and 24B and thereby rotates integratedly. Further, the outer race 52 is positioned by the cylindrical wall 46 of the center case 11M and the rotation thereof is stopped.

The one-way clutch 50 is constructed such as to, when the vehicle 3 travels forward by using the power of the first and the second motors 2A and 2B, go into engagement and lock the rotation of the ring gears 24A and 24B. More specifically, when a rotational power in the forward direction (the rotational direction at the time of making the vehicle 3 travel forward) on the first and the second motors 2A and 2B side is inputted to the rear wheel Wr side, the one-way clutch 50 goes into an engagement state. Further, when a rotational power in the reverse direction on the first and the second motors 2A and 2B side is inputted to the rear wheel Wr side, the one-way clutch 50 goes into a disengagement state. Furthermore, when a rotational power in the forward direction on the rear wheel Wr side is inputted to the first and the second motors 2A and 2B side, the one-way clutch 50 goes into a disengagement state. Further, when a rotational power in the reverse direction on the rear wheel Wr side is inputted to on the first and the second motors 2A and 2B side, the one-way clutch 50 goes into an engagement state.

As such, in the rear-wheel driving system 1 of the present embodiment, the one-way clutch 50 and the hydraulic brake 60 are provided in parallel to each other on the power transmission path between the first and the second motors 2A and 2B and the rear wheels Wr. Here, the hydraulic brake 60 is controlled between a released state, the weakly applied state, and a applied state by using the pressure of oil supplied from an electric oil pump (not shown) in accordance with the traveling state of the vehicle and the engagement or disengagement state of the one-way clutch 50. For example, when the vehicle 3 travels forward by the power driving of the first and the second motors 2A and 2B (at the time of a low vehicle speed or a middle vehicle speed), the one-way clutch 50 is engaged regardless of the state of the hydraulic brake 60 so that a power-transmission permitted state is realized. Further, when the vehicle 3 travels forward by the power driving of the internal combustion engine 4 and/or the first and the second motors 5 (at the time of a high vehicle speed), the one-way clutch 50 goes into disengagement and, further, the hydraulic brake is controlled into a released state so that overspeed of the first and the second motors 2A and 2B is prevented. On the other hand, at the time of backward traveling of the vehicle 3 or regeneration, the one-way clutch 50 goes into disengagement and hence the hydraulic brake 60 is controlled into a applied state. As a result, the rotational power in the reverse direction on the first and the second motors 2A and 2B side is outputted to the rear wheel Wr side or the rotational power in the forward direction on the rear wheel Wr side is inputted to the first and the second motors 2A and 2B side.

Further, in the rear-wheel driving system 1 of the present embodiment, the bearings Br1 and Br2 are respectively composed of angular contact ball bearings capable of receiving the thrust forces in the axial outward direction acting onto the planetary gears 22A and 22B. Further, the bearings Br3 and Br4 are respectively composed of angular contact ball bearings capable of receiving the thrust forces in the axial outward direction acting onto the sun gears 21A and 21B. The bearings Br5 and Br6 are respectively composed of thrust bearings capable of receiving the thrust forces in the axial inward direction acting onto the planetary gears 22A and 22B. The bearings Br7 and Br8 are composed of angular contact ball bearings capable of receiving the thrust forces in the axial inward direction acting onto the sun gears 21A and 21B. In contrast, the bearings Br 9 to 12 are composed of needle bearings not capable of receiving a thrust force. Here, in the bearings Br1 to Br4 and the bearings Br7 and Br8, bearings such as conical roller bearings may be selected and employed suitably in place of the angular contact ball bearings as long as the bearings are capable of receiving a thrust force. Alternatively, bearings such as deep groove ball bearings may be selected and employed suitably that can receive thrust forces in both of the axial inward and the axial outward directions.

Here, engagement of the planetary gears 22A and 22B is described below.

Figure 5:
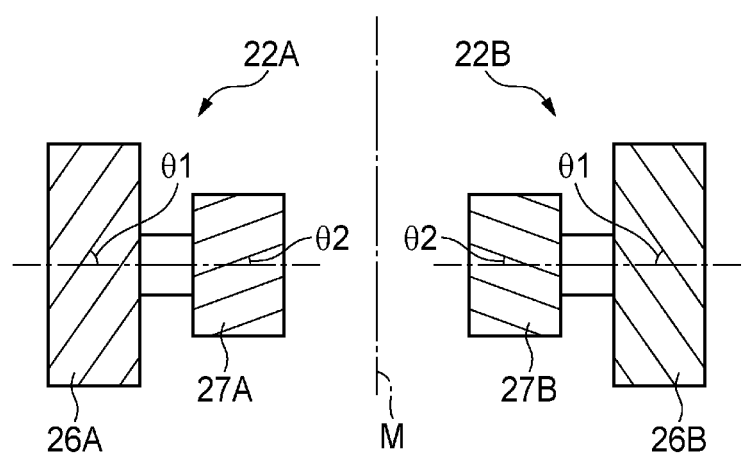
FIG. 5 is a schematic diagram describing the direction of torsion of the engaging teeth of first pinions and second pinions of planetary gears.

In the planetary gears 22A and 22B, as shown in FIG. 5, in the first pinions 26A and 26B of large diameter respectively engaging with the sun gears 21A and 21B and in the second pinions 27A and 27B of small diameter, the directions of torsion of the engaging teeth are the same as each other. Thus, the thrust forces generated in the first pinions 26A and 26B of large diameter and the second pinions 27A and 27B of small diameter by the torsion are opposite to each other.

Further, the torsion angle $\theta 1$ of the first pinions 26A and 26B of large diameter engaging with the sun gears 21A and 21B is set to be greater than the torsion angle $\theta 2$ of the second pinions 27A and 27B of small diameter engaging with the gear portions 28A and 28B of the ring gears 24A and 24B. As a result, the thrust force generated by the planetary gears 22A and 22B is larger in the second pinions 27A and 27B of small diameter than the first pinions 26A and 26B of large diameter.

Here, the planetary gear 22A of the first planetary gear type speed reducer 12A and the planetary gear 22B of the second planetary gear type speed reducer 12B are vertical to a straight line containing the rotational axis O of the first and the second planetary gear type speed reducers 12A and 12B and are mutually mirror symmetric with respect to the middle plane M located between the first and the second planetary gear type speed reducers 12A and 12B. Thus, the torsion angles $\theta 1$ and $\theta 2$ of the engaging teeth are also mutually mirror symmetric. Thus, in the planetary gear 22A and the planetary gear 22B, when the input torques from the first and the second motors 2A and 2B are equal to each other, the thrust forces acting on the planetary gears 22A and 22B (also referred to as planetary gear total thrust forces, hereinafter) each obtained as the total of the thrust force generated in the engagement portion of the second pinion 27A or 27B of small diameter and the thrust force generated in the engagement portion of the first pinion 26A or 26B of large diameter become mutually mirror symmetric with respect to the middle plane M.

Figure 6:
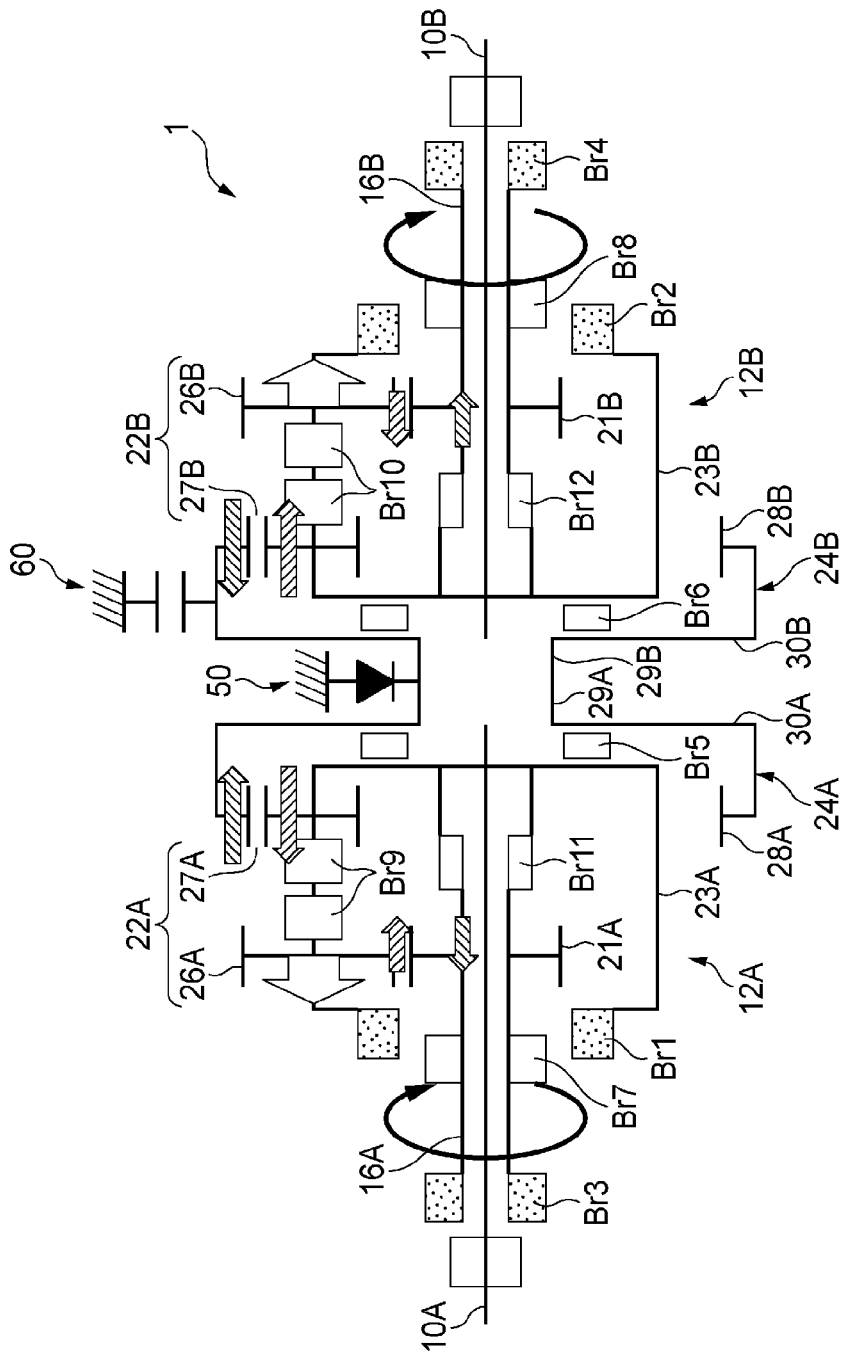
FIG. 6 is a schematic configuration diagram showing thrust forces at the time of acceleration in straight traveling.

FIG. 6 is a block diagram showing the thrust forces generated in the rear-wheel driving system 1 at the time of acceleration in straight traveling, that is, in a case that the first and the second motors 2A and 2B generate motoring torques approximately equivalent to each other in the forward direction. In FIGS. 6 to 10, arrows around the rotational axis O indicate the torques of the first and the second motors 2A and 2B. A clockwise arrow indicates a torque in the forward direction (e.g., a motoring torque at the time of vehicle forward traveling) and a counterclockwise arrow indicates a torque in the reverse direction (e.g., a regeneration torque at the time of vehicle forward traveling). A shaded arrow overlapping with each gear indicates the thrust force generated by the gear. A white arrow indicates the planetary gear total thrust force and a black arrow indicates the thrust force (also referred to as the ring gear total thrust force, hereinafter) acting on the ring gears 24A and 24B obtained as the total of the thrust force generated in the engagement portion of the ring gear 24A of the first planetary gear type speed reducer 12A and the thrust force generated in the engagement portion of the ring gear 24B of the second planetary gear type speed reducer 12B. Further, bearings to receive a thrust force are marked with a dot and thereby distinguished from bearing not to receive a thrust force.

As shown in FIG. 6, when motoring torques in the forward direction are inputted from the first and the second motors 2A and 2B at the time of acceleration in straight traveling, as a result of engagement with the first pinions 26A and 26B of large diameter, thrust forces in the axial outward direction (forces in the direction of departing) act on the sun gears 21A and 21B and thrust forces in the axial inward direction (forces in the direction of approaching) act on the first pinions 26A and 26B of large diameter. Further, as a result of engagement with the ring gears 24A and 24B, thrust forces in the axial outward direction act on the second pinions 27A and 27B of small diameter and thrust forces in the axial inward direction act on the ring gears 24A and 24B. As described above, as a result of the difference in the torsion angle, the thrust forces are larger in the second pinions 27A and 27B of small diameter than in the first pinions 26A and 26B of large diameter. Thus, the planetary gear total thrust forces in the axial outward direction act respectively on the planetary gears 22A and 22B.

The planetary gear total thrust forces in the axial outward direction acting on the planetary gears 22A and 22B are received respectively through the planetary carriers 23A and 23B by the bearings Br1 and Br2. Further, the thrust forces in the axial outward direction acting on the sun gears 21A and 21B are received respectively by the bearings Br3 and Br4. Then, the thrust forces in the axial inward direction acting on the ring gears 24A and 24B are canceled out with each other when pushing each other in the small diameter portions 29A and 29B. That is, at this time of acceleration in straight traveling, the thrust forces in the axial inward direction acting on the ring gears 24A and 24B become equal to each other because the motoring torques of the first and the second motors 2A and 2B are equal to each other. Thus, the thrust forces are canceled out with each other in the small diameter portions 29A and 29B of the ring gears 24A and 24B. Accordingly, the first planetary gear type speed reducer 12A and the second planetary gear type speed reducer 12B constitute a closed system and then the thrust forces are supported within the closed system.

Figure 7:
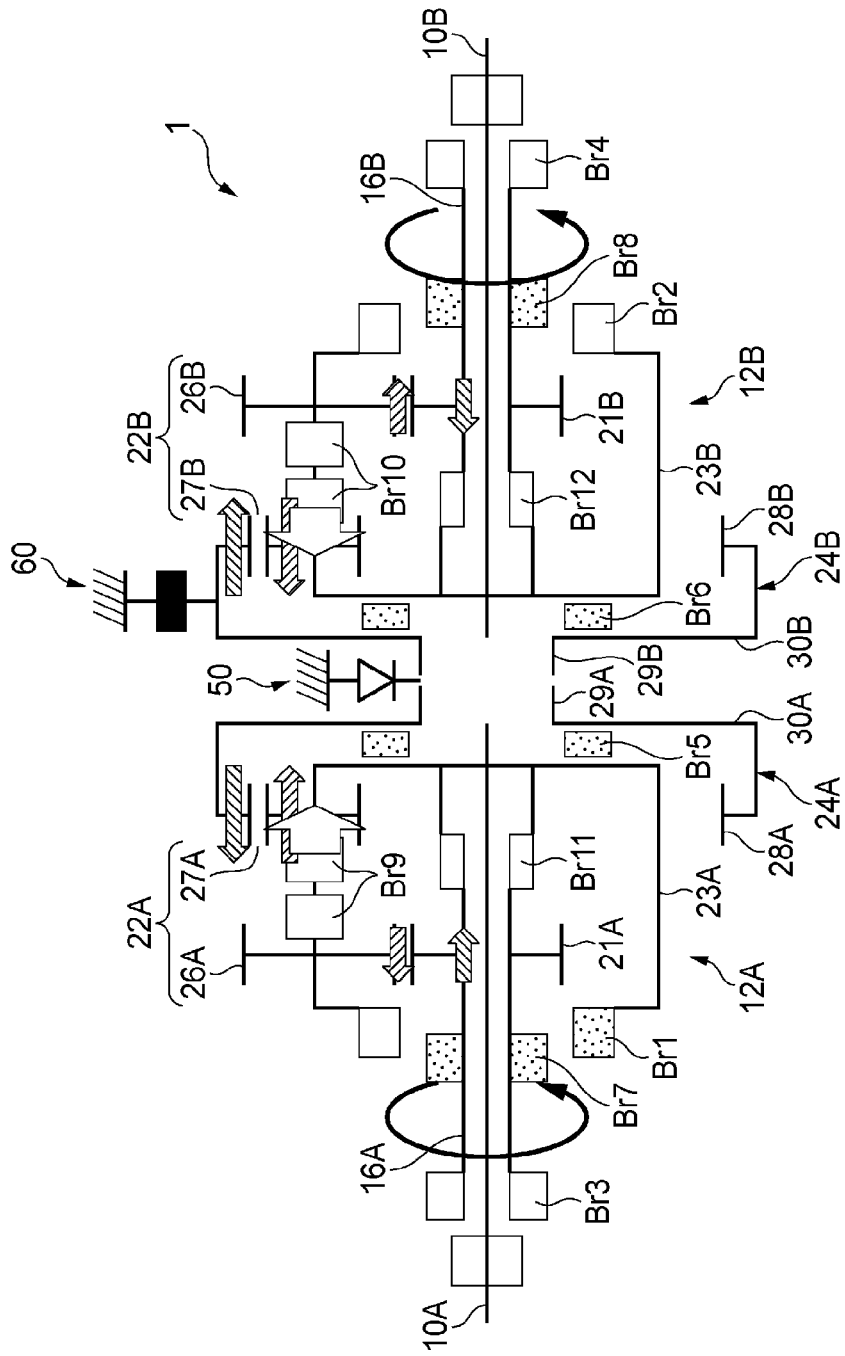
FIG. 7 is a schematic configuration diagram showing thrust forces at the time of deceleration in straight traveling.

FIG. 7 is a block diagram showing the thrust forces generated in the rear-wheel driving system 1 at the time of deceleration in straight traveling, that is, in a case that the first and the second motors 2A and 2B generate regeneration torques approximately equivalent to each other in the reverse direction.

As shown in FIG. 7, when regeneration torques in the reverse direction are inputted from the first and the second motors 2A and 2B at the time of deceleration in straight traveling, as a result of engagement with the first pinions 26A and 26B of large diameter, thrust forces in the axial inward direction act on the sun gears 21A and 21B and thrust forces in the axial outward direction act on the first pinions 26A and 26B of large diameter. Further, as a result of engagement with the ring gears 24A and 24B, thrust forces in the axial inward direction act on the second pinions 27A and 27B of small diameter, and thrust forces in the axial outward direction act on the ring gears 24A and 24B. As described above, as a result of the difference in the torsion angle, the thrust forces are larger in the second pinions 27A and 27B of small diameter than in the first pinions 26A and 26B of large diameter. Thus, the planetary gear total thrust forces in the axial inward direction act respectively on the planetary gears 22A and 22B.

The planetary gear total thrust forces in the axial inward direction acting on the planetary gears 22A and 22B are received respectively through the planetary carriers 23A and 23B by the bearings Br5 and Br6 and then transmitted to the ring gears 24A and 24B. Then, the thrust forces each obtained when the thrust force in the axial inward direction transmitted through the bearing Br5 or Br6 to the ring gear 24A or 24B is subtracted from the thrust force in the axial outward direction acting on the ring gear 24A or 24B move the small diameter portions 29A and 29B of the ring gears 24A and 24B such as to depart from each other. Further, the thrust forces in the axial inward direction acting on the sun gears 21A and 21B are received respectively by the bearings Br7 and Br8. That is, at this time of deceleration in straight traveling, the thrust forces in the axial outward direction acting on the ring gears 24A and 24B cause the small diameter portions 29A and 29B of the ring gears 24A and 24B to depart from each other. Thus, the first planetary gear type speed reducer 12A and the second planetary gear type speed reducer 12B constitute mutually independent closed systems and then the thrust forces are supported within each closed system.

Here, the relation between the thrust forces in FIG. 7 holds not only at the time of deceleration in straight traveling but also at the time of acceleration in backward traveling. In this case, the first and the second motors 2A and 2B input the motoring torques in the reverse direction.

Figure 8:
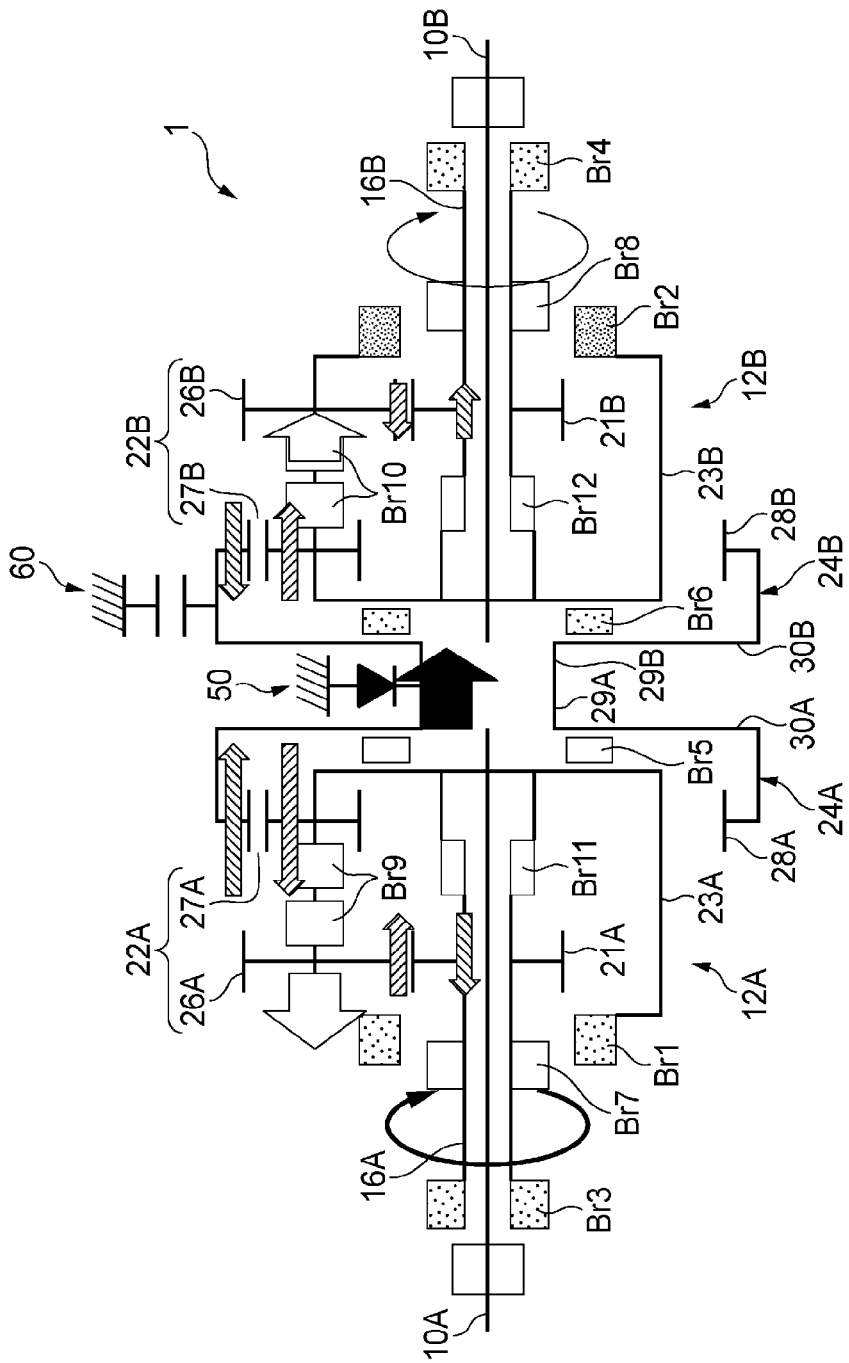
FIG. 8 is a schematic configuration diagram showing thrust forces at the time of acceleration in turning.

FIG. 8 is a block diagram showing thrust forces generated in the rear-wheel driving system 1 in a case (right turn) that the motoring torque in the forward direction of the first motor 2A is larger than the motoring torque in the forward direction of the second motor 2B at the time of acceleration in turning.

As shown in FIG. 8, the directions of the thrust forces acting on the individual gears at that time are similar to those at the time of acceleration in straight traveling in FIG. 6. However, the motoring torque in the forward direction of the first motor 2A is larger than the motoring torque in the forward direction of the second motor 2B. Thus, the planetary gear total thrust force acting on the first planetary gear type speed reducer 12A is larger than the planetary gear total thrust force acting on the second planetary gear type speed reducer 12B. Further, also the thrust force acting on the ring gear 24A is larger than the thrust force acting on the ring gear 24B. Thus, the difference is not canceled out and acts from the small diameter portion 29A of the first planetary gear type speed reducer 12A to the small diameter portion 29B of the second planetary gear type speed reducer 12B as the ring gear total thrust force. This ring gear total thrust force is received by the bearing Br6 and then transmitted to the planetary carrier 23B. Then, a thrust force obtained by adding to this ring gear total thrust force the planetary gear total thrust force in the axial outward direction acting on the planetary gears 22B is received by the bearing Br2. That is, at this time of acceleration in turning, a part of the thrust forces are not canceled out with each other in the small diameter portions 29A and 29B of the ring gears 24A and 24B and hence the difference between the thrust forces moves between the first planetary gear type speed reducer 12A and the second planetary gear type speed reducer 12B.

Here, although not shown in the figure, in a case (left turn) that the motoring torque in the forward direction of the second motor 2B is larger than the motoring torque in the forward direction of the first motor 2A, the thrust force in the axial inward direction acting on the ring gear 24B is larger than the thrust force in the axial inward direction acting on the ring gear 24A. Thus, the difference is not canceled out and acts from the small diameter portion 29B to the small diameter portion 29A as the ring gear total thrust force. This ring gear total thrust force is received by the bearing Br5. Further, a thrust force obtained by adding the planetary gear total thrust force to the ring gear total thrust force is received by the bearing Br1.

Figure 9:
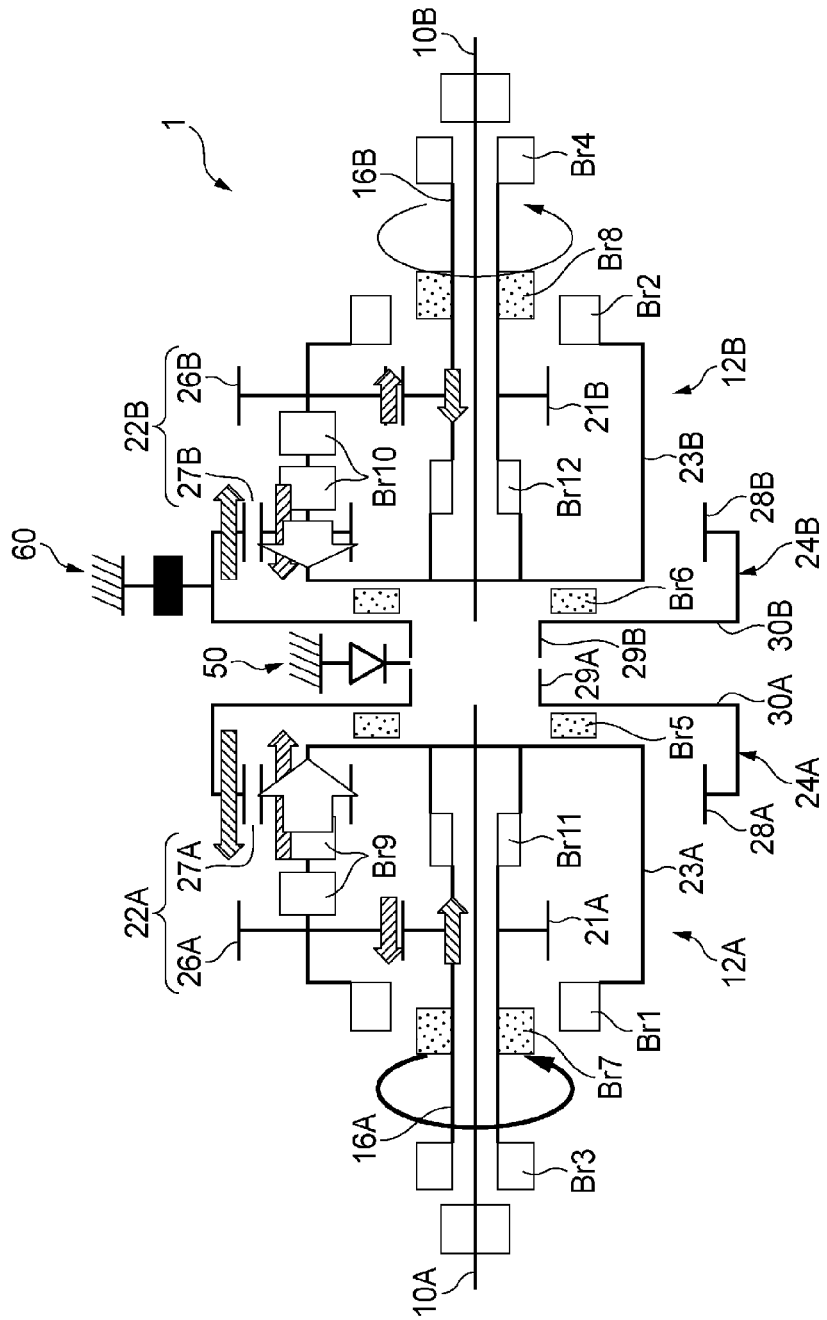
FIG. 9 is a schematic configuration diagram showing thrust forces at the time of deceleration in turning.

FIG. 9 is a block diagram showing thrust forces generated in the rear-wheel driving system 1 in a case (left turn) that the regeneration torque in the reverse direction of the first motor 2A is larger than the regeneration torque in the reverse direction of the second motor 2B at the time of deceleration in turning.

As shown in FIG. 9, the directions of the thrust forces acting on the individual gears at that time are similar to those at the time of deceleration in straight traveling in FIG. 7. However, the regeneration torque in the reverse direction of the first motor 2A is larger than the regeneration torque in the reverse direction of the second motor 2B. Thus, the planetary gear total thrust force acting on the first planetary gear type speed reducer 12A is larger than the planetary gear total thrust force acting on the second planetary gear type speed reducer 12B. Further, also the thrust force acting on the ring gear 24A is larger than the thrust force acting on the ring gear 24B and hence the amount of movement of the small diameter portion 29A becomes larger than the amount of movement of the small diameter portion 29B. However, at this time of deceleration in turning, the small diameter portions 29A and 29B depart from each other. Thus, the ring gear total thrust force does not act between the first planetary gear type speed reducer 12A and the second planetary gear type speed reducer 12B. Accordingly, the first planetary gear type speed reducer 12A and the second planetary gear type speed reducer 12B constitute mutually independent closed systems and then the thrust forces are supported within each closed system.

Here, although not shown in the figure, in a case (right turn) that the regeneration torque in the reverse direction of the second motor 2B is larger than the regeneration torque in the reverse direction of the first motor 2A, the planetary gear total thrust force acting on the second planetary gear type speed reducer 12B becomes larger than the planetary gear total thrust force acting on the first planetary gear type speed reducer 12A. However, similarly to FIG. 9, the small diameter portions 29A and 29B depart from each other. Thus, the ring gear total thrust force does not act between the first planetary gear type speed reducer 12A and the second planetary gear type speed reducer 12B.

Figure 10:
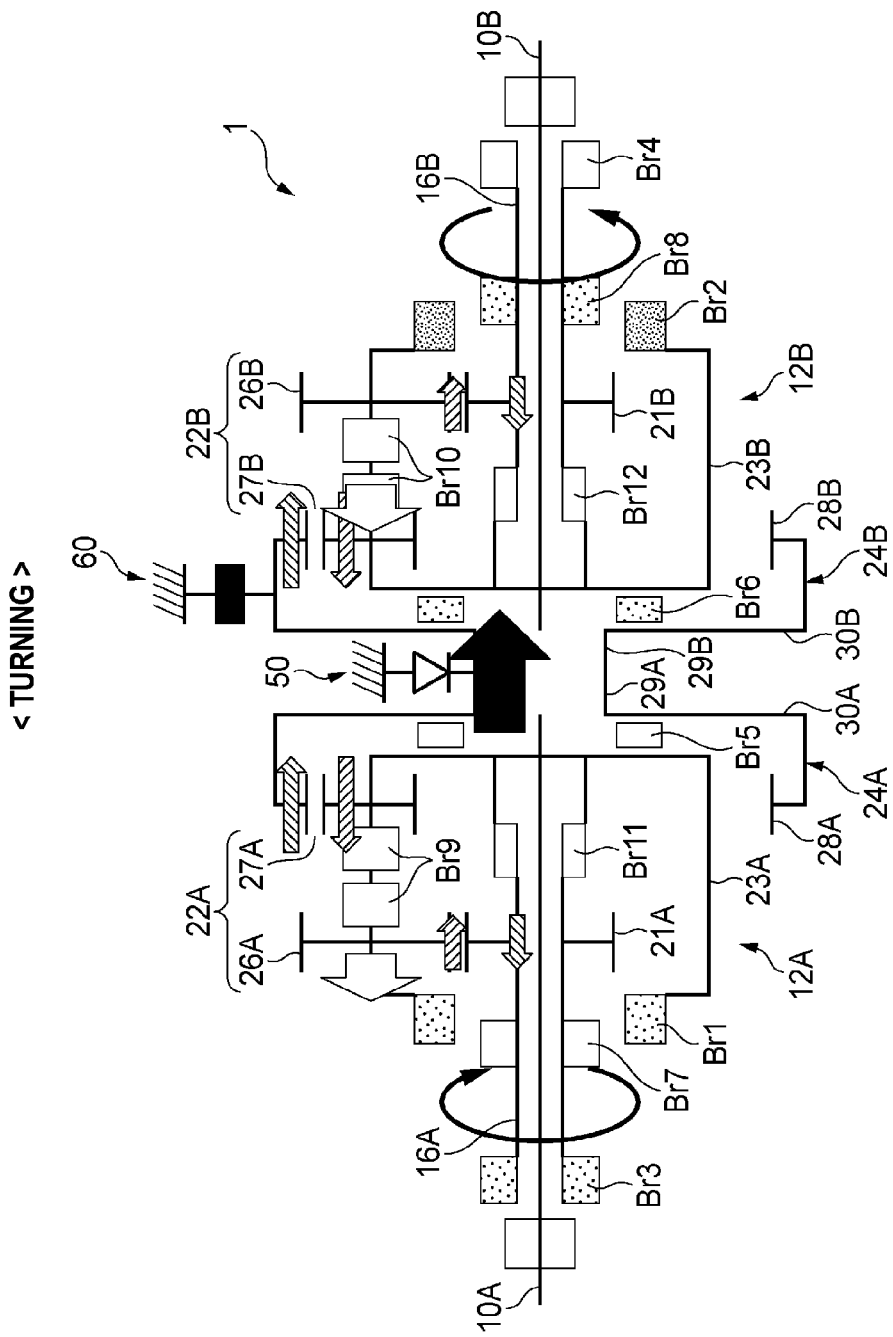
FIG. 10 is a schematic configuration diagram showing thrust forces at the time of turning.

FIG. 10 is a block showing thrust forces generated in the rear-wheel driving system 1 in a case (right turn) that the first motor 2A generates a motoring torque in the forward direction and the second motor 2B generates a regeneration torque in the reverse direction at the time of turning.

As shown in FIG. 10, when a motoring torque in the forward direction acts from the first motor 2A, as a result of engagement with the first pinion 26A of large diameter, a thrust force in the axial outward direction acts on the sun gear 21A, and a thrust force in the axial inward direction acts on the first pinion 26A of large diameter. Further, as a result of engagement with the ring gear 24A, a thrust force in the axial outward direction acts on the second pinion 27A of small diameter and a thrust force in the axial inward direction acts on the ring gear 24A. As described above, as a result of the difference in the torsion angle, the thrust force is larger in the second pinion 27A of small diameter than in the first pinion 26A of large diameter. Thus, the planetary gear total thrust force in the axial outward direction acts on the planetary gear 22A.

On the other hand, when a regeneration torque in the reverse direction acts from the second motor 2B, as a result of engagement with the first pinion 26B of large diameter, a thrust force in the axial inward direction acts on the sun gear 21B, and a thrust force in the axial outward direction acts on the first pinion 26B of large diameter. Further, as a result of engagement with the ring gear 24B, a thrust force in the axial inward direction acts on the second pinion 27B of small diameter and a thrust force in the axial outward direction acts on the ring gear 24B. As described above, as a result of the difference in the torsion angle, the thrust force is larger in the second pinion 27B of small diameter than in the first pinion 26B of large diameter. Thus, the planetary gear total thrust force in the axial inward direction acts on the planetary gear 22B.

At that time, the ring gears 24A and 24B move in the same direction, that is, from the first planetary gear type speed reducer 12A side toward the second planetary gear type speed reducer 12B side. However, in the ring gear 24B, movement is restricted by the bearing Br6 and hence the small diameter portion 29A abuts against the small diameter portion 29B. Thus, the thrust force ring gear total thrust force acts which is a resultant thrust force obtained from the thrust force in the axial inward direction acting on the ring gear 24A and the thrust force in the axial outward direction acting on the ring gear 24B.

This ring gear total thrust force is received by the bearing Br6 and then transmitted to the planetary carrier 23B. Then, a thrust force obtained by subtracting the planetary gear total thrust force in the axial inward direction acting on the planetary gears 22B from this ring gear total thrust force is received by the bearing Br2. Further, the planetary gear total thrust force in the axial outward direction acting on the planetary gear 22A is received through the planetary carrier 23A by the bearing Br1. Further, the thrust force in the axial outward direction acting on the sun gear 21A is received by the bearing Br3. Further, the thrust force in the axial inward direction acting on the sun gear 21B is received by the bearing Br8. That is, at this time of turning, the thrust forces are added together in the small diameter portions 29A and 29B of the ring gears 24A and 24B and then the added thrust force moves between the first planetary gear type speed reducer 12A and the second planetary gear type speed reducer 12B.

In the rear-wheel driving system 1 of the present embodiment having this configuration, when the first and the second motors 2A and 2B generate torques in the forward direction, thrust forces in the axial inward direction which are forces in the direction of approaching each other act on the ring gears 24A and 24B. Thus, the thrust forces acting on the ring gears 24A and 24B can be canceled out with each other. In particular, when the first and the second motors 2A and 2B generate identical torques in the forward direction, the thrust forces acting on the ring gears 24A and 24B can completely be canceled out with each other. Then, when setting is performed such that at the time of acceleration in forward traveling which is used most frequently in vehicle traveling, the thrust forces acting on the ring gears 24A and 24B are canceled out with each other, load to the bearings can be reduced.

Further, at that time, thrust forces in the axial outward direction act respectively on the sun gears 21A and 21B and then are received by the bearings Br3 and Br4. This can prevent the sun gears 21A and 21B from moving excessively. Further, at that time, planetary gear total thrust forces in the axial outward direction act respectively on the planetary gears 22A and 22B and then received by the bearings Br1 and Br2. This can prevent the planetary gears 22A and 22B from moving excessively. Here, when the planetary gear 22A and the 22B are composed of double pinions, the engagement condition such as the inclination of the tooth surface can be formed separately and independently. This permits adjustment of the direction and the magnitude of the planetary gear total thrust force.

On the other hand, when the first and the second motors 2A and 2B generate torques in the reverse direction, thrust forces in the axial outward direction which is forces in the direction of departing from each other act on the ring gears 24A and 24B. Thus, the system can be divided into the first planetary gear type speed reducer 12A and the second planetary gear type speed reducer 12B. Thus, when the system is divided, a situation can be suppressed that a thrust force acts excessively on one side.

Further, at that time, thrust forces in the axial inward direction act respectively on the sun gears 21A and 21B and then are received by the bearings Br7 and Br8. This can prevent the sun gears 21A and 21B from moving excessively. Further, at that time, planetary gear total thrust forces in the axial inward direction act respectively on the planetary gears 22A and 22B and then received by the bearings Br5 and Br6. This can suppress the planetary gears 22A and 22B from moving excessively.

Here, at the time of turning, relatively large thrust forces act on the bearings Br1 and Br2 in some cases. However, acceleration in turning and the like is less frequently used among the traveling modes of the vehicle. Thus, load to the bearings Br1 and Br2 is low. From the reverse aspect, when the bearings Br1 and Br2 alone are set to be capable of receiving a relatively large thrust force, reliability can be ensured.

<Second Embodiment>

Figure 11:
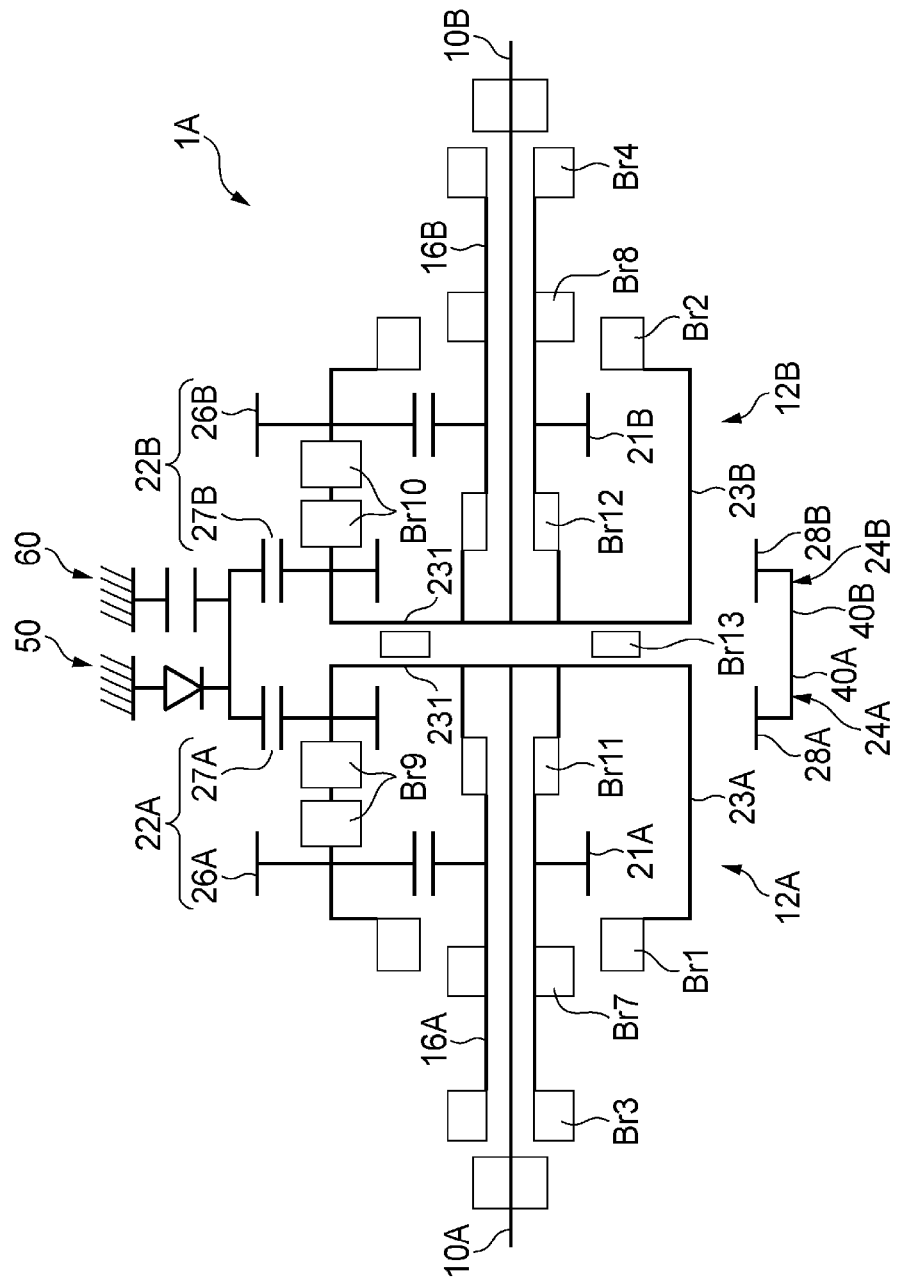
FIG. 11 is a schematic configuration diagram of a rear-wheel driving system of a second embodiment.

Next, a vehicle driving system of a second embodiment on which the power transmission system according to the present invention is mounted is described below with reference to FIG. 11. Here, configurations identical or equivalent to those of the first embodiment are designated by identical or equivalent numerals and hence their description is omitted.

The rear-wheel driving system 1A of the present embodiment is different from the rear-wheel driving system 1 of the first embodiment in the point that the ring gears 24A and 24B do not include the small diameter portions 29A and 29B and the linkage portions 30A and 30B and are constructed in an integrated manner such that the axis-directional extension portion 40A extended from the end portion on the second planetary gear type speed reducer 12B side of the gear portion 28A of the first planetary gear type speed reducer 12A and the axis-directional extension portion 40B extended from the end portion on the first planetary gear type speed reducer 12A side of the gear portion 28B of the second planetary gear type speed reducer 12B abut against each other.

That is, in the rear-wheel driving system 1A of the present embodiment, the ring gears 24A and 24B are coupled to each other in a manner permitting power transmission in the rotational direction and coupled in a manner permitting power transmission in the direction of pushing each other in the axial direction and in the direction of pulling each other in the axial direction. Thus, the ring gears 24A and 24B can move in a state of being coupled to each other when a difference is present between the thrust force acting on the ring gear 24A and the thrust force acting on the ring gear 24B which are thrust forces in the direction of pushing each other or pulling each other in the axial direction.

Further, a bearing Br13 composed of a thrust bearing is provided between the inner side arm 231 of the planetary carrier 23A and the inner side arm 231 of the planetary carrier 23B. Then, the bearing Br13 is constructed such as to receive the thrust forces of the planetary carriers 23A and 23B. That is, the bearing Br13 plays the roles of the bearings Br5 and Br6 in the first embodiment.

Similarly to the first embodiment, also in the rear-wheel driving system 1A of the present embodiment having this configuration, when the first and the second motors 2A and 2B generate torques in the forward direction, thrust forces in the axial inward direction which are forces in the direction of approaching each other act on the ring gears 24A and 24B. Thus, the thrust forces acting on the ring gears 24A and 24B can be canceled out with each other.

Further, at that time, thrust forces in the axial outward direction act respectively on the sun gears 21A and 21B and then are received by the bearings Br3 and Br4. This can prevent the sun gears 21A and 21B from moving excessively. Further, at that time, planetary gear total thrust forces in the axial outward direction act respectively on the planetary gears 22A and 22B and then received by the bearings Br1 and Br2. This can prevent the planetary gears 22A and 22B from moving excessively.

On the other hand, when the first and the second motors 2A and 2B generate identical torques in the reverse direction, thrust forces in the axial outward direction which are forces in the direction of departing from each other act on the ring gears 24A and 24B. However, since the ring gears 24A and 24B are coupled to each other also in the axial direction, the thrust forces can be canceled out with each other.

Further, at that time, thrust forces in the axial inward direction act respectively on the sun gears 21A and 21B and then are received by the bearings Br7 and Br8. This can prevent the sun gears 21A and 21B from moving excessively. Further, at that time, planetary gear total thrust forces in the axial inward direction act respectively on the planetary gears 22A and 22B and then received by the bearing Br13. This can suppress the planetary gears 22A and 22B from moving excessively.

Here, when the magnitudes of the torques generated in the first and the second motors 2A and 2B are different from each other, that is, at the time of acceleration in turning, deceleration in turning, turning, or the like as shown in FIGS. 8 to 10, since the ring gears 24A and 24B are coupled and movable also in the axial direction in contrast to the first embodiment, the difference between the thrust forces acting on the ring gears 24A and 24B serves as the ring gear total thrust force and moves the ring gears 24A and 24B. Thus, the thrust forces can be released without being transmitted to other members such as the planetary carriers 23A and 23B.

Even in these cases, the thrust forces in the axial outward direction acting on the sun gears 21A and 21B are received respectively by the bearings Br3 and Br4, and the thrust forces in the axial inward direction acting on the sun gears 21A and 21B are received respectively by the bearings Br7 and Br8. Further, the thrust forces in the axial outward direction acting on the planetary gears 22A and 22B are received respectively by the bearings Br1 and Br2, and the thrust forces in the axial inward direction acting on the planetary gears 22A and 22B are received by the bearing Br13 and then received respectively through the planetary carriers 23A and 23B by the bearings Br1 and Br2.

Here, in the present embodiment, the axis-directional extension portion 40A and the axis-directional extension portion 40B need not indispensably be constructed integratedly with each other, and it is sufficient that they are coupled to each other in the axial direction.

>Third Embodiment>

Figure 12:
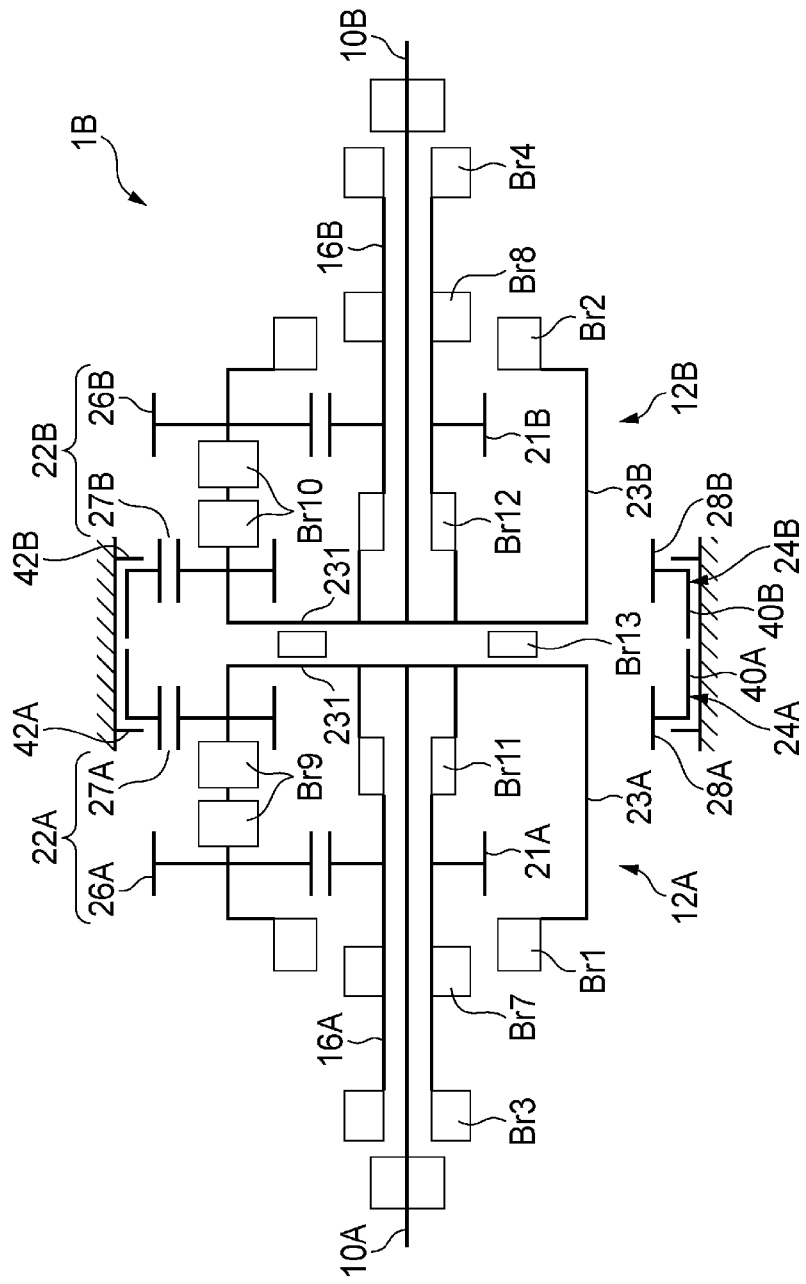
FIG. 12 is a schematic configuration diagram of a rear-wheel driving system of a third embodiment.

Next, a vehicle driving system of a third embodiment on which the power transmission system according to the present invention is mounted is described below with reference to FIG. 12. Here, configurations identical or equivalent to those of the second embodiment are designated by identical or equivalent numerals and hence their description is omitted.

The rear-wheel driving system 1B of the present embodiment is different from the rear-wheel driving system 1B of the second embodiment in the points that the axis-directional extension portion 40A extended from the end portion on the second planetary gear type speed reducer 12B side of the gear portion 28A of the first planetary gear type speed reducer 12A and the axis-directional extension portion 40B extended from the end portion on the first planetary gear type speed reducer 12A side of the gear portion 28B of the second planetary gear type speed reducer 12B are formed separately from each other and arranged such as to abut against each other and that a stopper 42A for restricting movement in the axial direction is provided on the side opposite to the axis-directional extension portion 40B in the axis-directional extension portion 40A and a stopper 42B for restricting movement in the axial direction is provided on the side opposite to the axis-directional extension portion 40A in the axis-directional extension portion 40B.

That is, in the rear-wheel driving system 1B of the present embodiment, the ring gears 24A and 24B are coupled in a manner permitting power transmission in the direction of pushing each other in the axial direction and not permitting power transmission in the direction of pulling each other in the axial direction. Then, in the ring gears 24A and 24B, when thrust forces of different magnitudes in the direction of approaching each other in the axial direction act or alternatively thrust forces in the direction of departing from each other act, the movement thereof is restricted by at least one of the stoppers 42A and 42B.

Further, neither the one-way clutch 50 nor the hydraulic brake 60 is provided. Further, the ring gears 24A and 24B are fixed to the case 11 and coupled to each other in a manner not permitting rotation. Thus, as long as the axles 10A and 10B coupled to the planetary carriers 23A and 23B are rotating, the first and the second motors 2A and 2B coupled to the sun gears 21A and 21B are also rotating. However, when induction motors are employed as the first and the second motors 2A and a 2B, generation of counter-electromotive forces can be prevented.

Similarly to the second embodiment, also in the rear-wheel driving system 1B of the present embodiment having this configuration, when the first and the second motors 2A and 2B generate torques in the forward direction, thrust forces in the axial inward direction which are forces in the direction of approaching each other act on the ring gears 24A and 24B. Thus, the thrust forces acting on the ring gears 24A and 24B can be canceled out with each other.

Further, at that time, thrust forces in the axial outward direction act respectively on the sun gears 21A and 21B and then are received by the bearings Br3 and Br4. This can prevent the sun gears 21A and 21B from moving excessively. Further, at that time, planetary gear total thrust forces in the axial outward direction act respectively on the planetary gears 22A and 22B and then received by the bearings Br1 and Br2. This can prevent the planetary gears 22A and 22B from moving excessively.

On the other hand, even when at least one of the first and the second motors 2A and 2B generates a torque in the reverse direction or alternatively even when torques in the forward direction are generated but the magnitudes of the torques are different from each other, a thrust force in the axial outward direction acts on any one or both of the ring gears 24A and 24B. However, the corresponding stoppers 42A and 42B receive the thrust force in the axial outward direction. Thus, the thrust forces acting on the ring gears 24A and 24B in the axial outward direction can be absorbed by the stoppers 42A and 42B without being transmitted to other members such as the planetary carriers 23A and 23B.

Even in this case, the thrust forces in the axial outward direction acting on the sun gears 21A and 21B are received respectively by the bearings Br3 and Br4, and the thrust forces in the axial inward direction acting on the sun gears 21A and 21B are received respectively by the bearings Br7 and Br8. Further, the thrust forces in the axial outward direction acting on the planetary gears 22A and 22B are received respectively by the bearings Br1 and Br2, and the thrust forces in the axial inward direction acting on the planetary gears 22A and 22B are received by the bearing Br13 and then received respectively through the planetary carriers 23A and 23B by the bearings Br1 and Br2.

Here, the axis-directional extension portion 40A and the axis-directional extension portion 40B need not indispensably be constructed separately from each other, and they may be constructed integratedly with each other.

The present invention is not limited to the embodiments described above and hence modifications, improvements, and the like may be made suitably.

For example, the planetary gear type speed reducer has been employed as an example of the speed changer. However, employable mechanisms are not limited to this and an ordinary gear type speed changer or the like may be employed.

Further, also in the first and the second embodiments, the one-way clutch 50 and/or the hydraulic brake 60 may be omitted. On the contrary, in the third embodiment, the one-way clutch 50 and/or the hydraulic brake 60 may be provided.

Here, the present application is based on a Japanese patent application (Patent Application No. 2011-263942) filed on Dec. 1, 2011, whose contents are incorporated herein by reference.

DESCRIPTION OF REFERENCE NUMERALS AND CHARACTERS

2A First motor (first power source)
2B Second motor (second power source)
3 Vehicle
11 Case (fixed portion)
12A First planetary gear type speed reducer (first speed changer)
12B Second planetary gear type speed reducer (second speed changer)
16A, 16B Cylindrical shaft (output shaft)
18A Partition (first partitioning wall)
18B Partition (second partitioning wall)
21A, 21B Sun gear (third rotational element)
22A, 22B Planetary gear (second rotational element)
23A, 23B Planetary carrier
24A, 24B Ring gear (first rotational element)
26A, 26B First pinion (large diameter pinion)

27A, 27B Second pinion (small diameter pinion)
28A, 28B Gear portion
40A, 40B Axis-directional extension portion (extension portion)
41A, 41B Inner-diameter side extension portion (extension portion)
42A, 42B Stopper
Br1 Bearing (first bearing)
Br2 Bearing (second bearing)
Br3 Bearing (third bearing)
Br4 Bearing (fourth bearing)
Br5 Bearing (fifth bearing)
Br6 Bearing (sixth bearing)
Br7 Bearing (seventh bearing)
Br8 Bearing (eighth bearing)
Br13 Bearing (fifth bearing, sixth bearing)
LWr Left rear wheel (left wheel)
RWr Right rear wheel (right wheel)

The invention claimed is:

1. A power transmission system comprising:
a first speed changer connected to an output shaft of a first power source; and
a second speed changer connected to an output shaft of a second power source, wherein:
each of the first speed changer and the second speed changer includes plural rotational elements;
a first rotational element of the first speed changer and a first rotational element of the second speed changer are coupled to each other in a manner permitting integrated rotation and have a same rotational axis;
the first speed changer includes a second rotational element engaging with the first rotational element of the first speed changer;
an engagement portion between the first rotational element and the second rotational element of the first speed changer is formed such that, when the first power source generates a rotational torque in one direction, a force acts on the first rotational element of the first speed changer in a direction of approaching the second speed changer along the rotational axis direction;
the second speed changer includes a second rotational element engaging with the first rotational element of the second speed changer; and
an engagement portion between the first rotational element and the second rotational element of the second speed changer is formed such that, when the second power source generates a rotational torque in one direction, a force acts on the first rotational element of the second speed changer in a direction of approaching the first speed changer along the rotational axis direction.

2. The power transmission system according to claim 1, wherein:
the engagement portion between the first rotational element and the second rotational element of the first speed changer is formed such that, when the first power source generates the rotational torque in the one direction, a force acts on the second rotational element of the first speed changer in a direction of departing from the second speed changer along the rotational axis direction;
the engagement portion between the first rotational element and the second rotational element of the second speed changer is formed such that, when the second power source generates the rotational torque in the one direction, a force acts on the second rotational element of the second speed changer in a direction of departing from the first speed changer along the rotational axis direction;
with respect to the second rotational element of the first speed changer, a first bearing capable of receiving the force acting on the second rotational element in the rotational axis direction is arranged on a side opposite to the second speed changer in the rotational axis direction; and
with respect to the second rotational element of the second speed changer, a second bearing capable of receiving the force acting on the second rotational element in the rotational axis direction is arranged on a side opposite to the first speed changer in the rotational axis direction.

3. The power transmission system according to claim 2, wherein:
the first speed changer includes a third rotational element engaging with the second rotational element, and an engagement portion between the second rotational element and the third rotational element is formed such that, when the first power source generates the rotational torque in the one direction, a force acts on the third rotational element of the first speed changer in the direction of departing from the second speed changer along the rotational axis direction;
the second speed changer includes a third rotational element engaging with the second rotational element, and an engagement portion between the second rotational element and the third rotational element is formed such that, when the second power source generates the rotational torque in the one direction, a force acts on the third rotational element of the second speed changer in the direction of departing from the first speed changer along the rotational axis direction;
with respect to the third rotational element of the first speed changer, a third bearing capable of receiving the force acting on the third rotational element in the rotational axis direction is arranged on the side opposite to the second speed changer in the rotational axis direction; and
with respect to the third rotational element of the second speed changer, a fourth bearing capable of receiving the force acting on the third rotational element in the rotational axis direction is arranged on the side opposite to the first speed changer in the rotational axis direction.

4. The power transmission system according to claim 1, wherein:
each of the first speed changer and the second speed changer is a planetary gear mechanism;
the planetary gear mechanism includes a sun gear, a planetary gear engaging with the sun gear, a planetary carrier supporting the planetary gear, and a ring gear engaging with an outer periphery side of the planetary gear;
the respective first rotational elements are the ring gear; and
the respective second rotational elements are the planetary gear.

5. The power transmission system according to claim 4, wherein the respective planetary gears are a double pinion constructed such that a large diameter pinion and a small diameter pinion are connected to each other.

6. The power transmission system according to claim 2, wherein the first rotational element of the first speed changer and the first rotational element of the second speed changer are coupled in a manner permitting power transmission in the rotational direction and permitting power transmission in a direction of pushing each other in the rotational axis direction and in a direction of pulling each other in the rotational axis direction.

7. The power transmission system according to claim 2, wherein the first rotational element of the first speed changer and the first rotational element of the second speed changer are coupled in a manner permitting power transmission in the rotational direction and permitting power transmission in a direction of pushing each other in the rotational axis direction and not permitting power transmission in a direction of pulling each other in the rotational axis direction.

8. The power transmission system according to claim 6, wherein:
the engagement portion between the first rotational element and the second rotational element of the first speed changer is formed such that, when the first power source generates a rotational torque in the other direction reverse to the one direction, a force acts on the first rotational element of the first speed changer in the direction of departing from the second speed changer along the rotational axis direction; and
the engagement portion between the first rotational element and the second rotational element of the second speed changer is formed such that, when the second power source generates a rotational torque in the other direction, a force acts on the first rotational element of the second speed changer in the direction of departing from the first speed changer along the rotational axis direction.

9. The power transmission system according to claim 8, wherein:
the engagement portion between the first rotational element and the second rotational element of the first speed changer is formed such that, when the first power source generates the rotational torque in the other direction, a force acts on the second rotational element of the first speed changer in the direction of approaching the second speed changer along the rotational axis direction;
the engagement portion between the first rotational element and the second rotational element of the second speed changer is formed such that, when the second power source generates the rotational torque in the other direction, a force acts on the second rotational element of the second speed changer in the direction of approaching the first speed changer along the rotational axis direction;
with respect to the second rotational element of the first speed changer, a fifth bearing capable of receiving the force acting on the second rotational element in the rotational axis direction is arranged on the second speed changer side in the rotational axis direction; and
with respect to the second rotational element of the second speed changer, a sixth bearing capable of receiving the force acting on the second rotational element in the rotational axis direction is arranged on the first speed changer side in the rotational axis direction.

10. The power transmission system according to claim 9, wherein:
the first speed changer includes a third rotational element engaging with the second rotational element, and an engagement portion between the second rotational element and the third rotational element is formed such that, when the first power source generates the rotational torque in the other direction, a force acts on the third rotational element of the first speed changer in the direction of approaching the second speed changer along the rotational axis direction;
the second speed changer includes a third rotational element engaging with the second rotational element, and an engagement portion between the second rotational element and the third rotational element is formed such that, when the second power source generates the rotational torque in the other direction, a force acts on the third rotational element of the second speed changer in the direction of approaching the first speed changer along the rotational axis direction;
with respect to the third rotational element of the first speed changer, a seventh bearing capable of receiving the force acting on the third rotational element in the rotational axis direction is arranged on the side opposite to the second speed changer in the rotational axis direction; and
with respect to the third rotational element of the second speed changer, an eighth bearing capable of receiving the force acting on the third rotational element in the rotational axis direction is arranged on the side opposite to the first speed changer in the rotational axis direction.

11. The power transmission system according to claim 10, wherein:
a first partitioning wall partitioning the first power source and the first speed changer from each other is provided between the first power source and the first speed changer;
a second partitioning wall partitioning the second power source and the second speed changer from each other is provided between the second power source and the second speed changer;
the first bearing and the seventh bearing are arranged in the first partitioning wall; and
the second bearing and the eighth bearing are arranged in the second partitioning wall.

12. The power transmission system according to claim 6, wherein:
each of the first speed changer and the second speed changer is a planetary gear mechanism;
the planetary gear mechanism includes a sun gear, a planetary gear engaging with the sun gear, a planetary carrier supporting the planetary gear, and a ring gear engaging with an outer periphery side of the planetary gear;
the first rotational element is the ring gear; and
the second rotational element is the planetary gear.

13. The power transmission system according to claim 12, wherein:
the ring gear of the first speed changer includes a gear portion and an extension portion extended from the second speed changer side end portion of the gear portion;
the ring gear of the second speed changer includes a gear portion and an extension portion extended from the first speed changer side end portion of the gear portion; and
the ring gear of the first speed changer and the ring gear of the second speed changer abut against each other at the extension portions.

14. The power transmission system according to claim 13, wherein:
the extension portion of the ring gear of the first speed changer includes an axis-directional extension portion extending toward the rotational axis direction; and
the extension portion of the ring gear of the second speed changer includes an axis-directional extension portion extending toward the rotational axis direction.

15. The power transmission system according to claim 12, wherein
the respective planetary gears are a double pinion constructed such that a large diameter pinion and a small diameter pinion are connected to each other.

16. The power transmission system according to claim 7, wherein:
- the engagement portion between the first rotational element and the second rotational element of the first speed changer is formed such that, when the first power source generates a rotational torque in the other direction reverse to the one direction, a force acts on the first rotational element of the first speed changer in the direction of departing from the second speed changer along the rotational axis direction;
- the engagement portion between the first rotational element and the second rotational element of the second speed changer is formed such that, when the second power source generates a rotational torque in the one direction, a force acts on the first rotational element of the second speed changer in the direction of departing from the first speed changer along the rotational axis direction;
- the engagement portion between the first rotational element and the second rotational element of the first speed changer is formed such that, when the first power source generates the rotational torque in the other direction, a force acts on the second rotational element of the first speed changer in the direction of approaching the second speed changer along the rotational axis direction;
- the engagement portion between the first rotational element and the second rotational element of the second speed changer is formed such that, when the second power source generates the rotational torque in the other direction, a force acts on the second rotational element of the second speed changer in the direction of approaching the first speed changer along the rotational axis direction;
- with respect to the second rotational element of the first speed changer, a fifth bearing capable of receiving the force acting on the second rotational element in the rotational axis direction is arranged on the second speed changer side in the rotational axis direction;
- with respect to the second rotational element of the second speed changer, a sixth bearing capable of receiving the force acting on the second rotational element in the rotational axis direction is arranged on the first speed changer side in the rotational axis direction;
- each of the first speed changer and the second speed changer is a planetary gear mechanism;
- the planetary gear mechanism includes a sun gear, a planetary gear engaging with the sun gear, a planetary carrier supporting the planetary gear, and a ring gear engaging with an outer periphery side of the planetary gear;
- the first rotational element is the ring gear;
- the second rotational element is the planetary gear;
- the ring gear of the first speed changer includes a gear portion and an extension portion extended from the second speed changer side end portion of the gear portion;
- the ring gear of the second speed changer includes a gear portion and an extension portion extended from the first speed changer side end portion of the gear portion;
- the ring gear of the first speed changer and the ring gear of the second speed changer abut against each other at the extension portions;
- the extension portion of the ring gear of the first speed changer includes an inner-diameter side extension portion extending toward a radial inward direction; and
- the extension portion of the ring gear of the second speed changer includes an inner-diameter side extension portion extending toward the radial inward direction.

17. The power transmission system according to claim 16, wherein:
- the inner-diameter side extension portion of the ring gear of the first speed changer and the planetary carrier of the first speed changer are constructed such as to overlap with each other in a radial direction;
- the inner-diameter side extension portion of the ring gear of the second speed changer and the planetary carrier of the second speed changer are constructed such as to overlap with each other in the radial direction;
- the fifth bearing is arranged between the ring gear of the first speed changer and the planetary carrier of the first speed changer; and
- the sixth bearing is arranged between the ring gear of the second speed changer and the planetary carrier of the second speed changer.

18. The power transmission system according to claim 7, wherein:
- the engagement portion between the first rotational element and the second rotational element of the first speed changer is formed such that, when the first power source generates a rotational torque in the other direction reverse to the one direction, a force acts on the first rotational element of the first speed changer in the direction of departing from the second speed changer along the rotational axis direction;
- the engagement portion between the first rotational element and the second rotational element of the second speed changer is formed such that, when the second power source generates a rotational torque in the one direction, a force acts on the first rotational element of the second speed changer in the direction of departing from the first speed changer along the rotational axis direction;
- the engagement portion between the first rotational element and the second rotational element of the first speed changer is formed such that, when the first power source generates the rotational torque in the other direction, a force acts on the second rotational element of the first speed changer in the direction of approaching the second speed changer along the rotational axis direction;
- the engagement portion between the first rotational element and the second rotational element of the second speed changer is formed such that, when the second power source generates the rotational torque in the other direction, a force acts on the second rotational element of the second speed changer in the direction of approaching the first speed changer along the rotational axis direction;
- with respect to the second rotational element of the first speed changer, a fifth bearing capable of receiving the force acting on the second rotational element in the rotational axis direction is arranged on the second speed changer side in the rotational axis direction;
- with respect to the second rotational element of the second speed changer, a sixth bearing capable of receiving the force acting on the second rotational element in the rotational axis direction is arranged on the first speed changer side in the rotational axis direction;
- each of the first speed changer and the second speed changer is a planetary gear mechanism;
- the planetary gear mechanism includes a sun gear, a planetary gear engaging with the sun gear, a planetary carrier supporting the planetary gear, and a ring gear engaging with an outer periphery side of the planetary gear;
- the first rotational element is the ring gear;
- the second rotational element is the planetary gear;

the ring gear of the first speed changer includes a gear portion and an extension portion extended from the second speed changer side end portion of the gear portion;

the ring gear of the second speed changer includes a gear portion and an extension portion extended from the first speed changer side end portion of the gear portion;

the ring gear of the first speed changer and the ring gear of the second speed changer abut against each other at the extension portions;

the extension portion of the ring gear of the first speed changer includes an axis-directional extension portion extending toward the rotational axis direction;

the extension portion of the ring gear of the second speed changer includes an axis-directional extension portion extending toward the rotational axis direction;

the ring gear of the first speed changer includes a stopper provided on a side opposite to the axis-directional extension portion of the ring gear in the rotational axis direction and restricting the ring gear from moving in the rotational axis direction; and the ring gear of the second speed changer includes a stopper provided on a side opposite to the axis-directional extension portion of the ring gear in the rotational axis direction and restricting the ring gear from moving in the rotational axis direction.

19. The power transmission system according to claim 1, wherein the first rotational element of the first speed changer and the first rotational element of the second speed changer are fixed to a fixed portion and coupled in the rotational direction.

20. The power transmission system according to claim 1, wherein the first and the second speed changers are arranged adjacent to each other between the first and the second power sources.

21. The power transmission system according to claim 1, wherein:

the first power source is connected through the first speed changer to a left wheel of a vehicle;

the second power source is connected through the second speed changer to a right wheel of the vehicle; and when the first and the second power sources generate the rotational torques in the one direction so that the left wheel and the right wheel rotate in the one direction, the vehicle moves in a forward direction.

* * * * *